(12) United States Patent
Bracken

(10) Patent No.: US 12,261,885 B2
(45) Date of Patent: Mar. 25, 2025

(54) SYSTEM AND METHOD FOR MAINTAINING INTERNET ANONYMITY VIA CLIENT FINGERPRINT

(71) Applicant: Plaid Inc., San Francisco, CA (US)

(72) Inventor: Shawn Bracken, San Francisco, CA (US)

(73) Assignee: Plaid Inc., San Francisco, CA (US)

( * ) Notice: Subject to any disclaimer, the term of this patent is extended or adjusted under 35 U.S.C. 154(b) by 0 days.

(21) Appl. No.: 18/477,745

(22) Filed: Sep. 29, 2023

(65) Prior Publication Data

US 2024/0031408 A1 Jan. 25, 2024

Related U.S. Application Data

(63) Continuation of application No. 16/880,114, filed on May 21, 2020, now Pat. No. 11,785,046.

(60) Provisional application No. 62/850,890, filed on May 21, 2019.

(51) Int. Cl.
*H04L 9/40* (2022.01)
*H04L 41/0813* (2022.01)
*H04L 67/01* (2022.01)

(52) U.S. Cl.
CPC ........ *H04L 63/166* (2013.01); *H04L 41/0813* (2013.01); *H04L 63/0428* (2013.01); *H04L 63/10* (2013.01); *H04L 67/01* (2022.05)

(58) Field of Classification Search
CPC ... H04L 63/166; H04L 67/01; H04L 41/0813; H04L 63/0428; H04L 63/10
USPC .......................................................... 726/3
See application file for complete search history.

(56) References Cited

U.S. PATENT DOCUMENTS

| | | | |
|---|---|---|---|
| 7,430,755 B1 * | 9/2008 | Hughes | H04L 9/3263 726/4 |
| 10,298,404 B1 | 5/2019 | Behm et al. | |
| 10,462,116 B1 * | 10/2019 | Sharifi Mehr | H04L 63/062 |
| 11,082,403 B2 | 8/2021 | McGinnity et al. | |
| 2008/0022374 A1 | 1/2008 | Brown et al. | |
| 2014/0337614 A1 * | 11/2014 | Kelson | H04L 63/166 713/152 |
| 2015/0113264 A1 * | 4/2015 | Wang | H04L 63/0464 713/151 |
| 2015/0350209 A1 | 12/2015 | Tamura | |
| 2016/0119287 A1 | 4/2016 | Khazan et al. | |

(Continued)

FOREIGN PATENT DOCUMENTS

WO 2019200402 A1 10/2019

OTHER PUBLICATIONS

Co-pending U.S. Appl. No. 16/880,114, inventor Bracken; Shawn, filed May 21, 2020.

(Continued)

*Primary Examiner* — Nicholas R Taylor
*Assistant Examiner* — Chong G Kim
(74) *Attorney, Agent, or Firm* — Harrity & Harrity, LLP

(57) ABSTRACT

A system and method for altering client fingerprint that includes editing data components of network communication from a client device to a server, which comprises editing network protocol data from the client during negotiation of a cryptographic protocol; selectively enabling access to library components specified in the edited client network protocol data; and sending a client communication to the server using the edited client network protocol data.

20 Claims, 19 Drawing Sheets

(56) References Cited

U.S. PATENT DOCUMENTS

| | | | |
|---|---|---|---|
| 2017/0068954 | A1 | 3/2017 | Hockey et al. |
| 2017/0223049 | A1 | 8/2017 | Kuperman et al. |
| 2018/0026797 | A1 | 1/2018 | Behm et al. |
| 2018/0039988 | A1 | 2/2018 | Gupta |
| 2018/0234341 | A1 | 8/2018 | Ignatchenko |
| 2018/0324153 | A1* | 11/2018 | Althouse ............... H04L 9/3236 |
| 2019/0182235 | A1* | 6/2019 | Raman ................. H04L 67/141 |
| 2019/0318122 | A1 | 10/2019 | Hockey et al. |
| 2020/0213206 | A1* | 7/2020 | Bracken ............. H04L 63/0281 |

OTHER PUBLICATIONS

Husak M., et al., "Network-based HTTPS Client Identification Using SSL/TLS Fingerprinting," 2015 10th International Conference on Availability, Reliability and Security, IEEE, Aug. 24, 2015, pp. 389-396.

Ulrich J., "Browser Fingerprinting via SSL Client Hello Messages," InfoSec Handlers Diary Blog, Dec. 11, 2013, pp. 1-5.

* cited by examiner

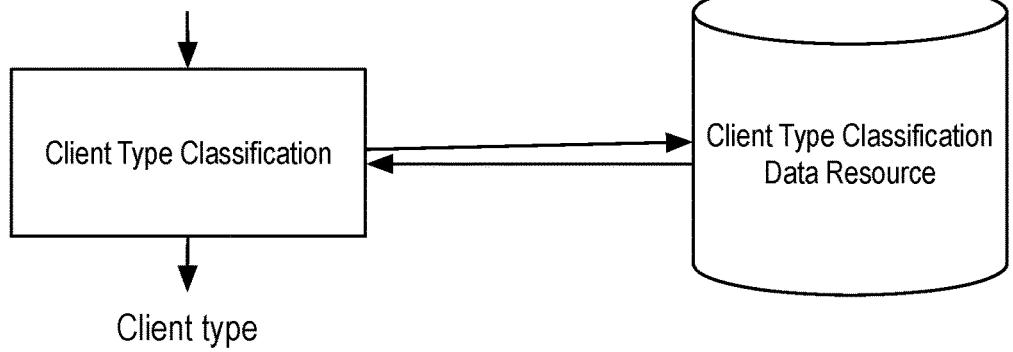

Client Hello Message

```
ProtocolVersion client_version;
Random random;
SessionID session_id;
CipherSuite <client cipher suite list>;
CompressionMethod <compression methods list>;
Extension <extension list>
``` cipherSuisteHash = hash(<client cipher suite list>)

compressionMethodsHash = hash(<compression methods list>)

extensionsHash = hash(<extension list>)

client_fingerprint = hash( cipherSuisteHash, compressionMethodsHash, extensionsHash )

client_fingerprint
FEF417DFB97DF4EC8715382CE80770A1

Client Type Classification

Client Type Classification Data Resource

Client type

FIGURE 12

Editing TLS cryptographic protocol client hello message data from the client during negotiation of a TLS/SSL handshake protocol S410

Modifying listed supported version of TLS/SSL protocol in client hello message data Modifying list of client cipher suites in client hello message data Modifying list of compression methods in client hello message data Modifying list of client point formats in client hello message data Modifying list of client supported application protocols in client hello message data Modifying list of client supported extensions in client hello message data selectively enabling access to library components specified in the edited client network protocol data S420

Enabling access to library for the modified supported version of TLS/SSL protocol Enabling access to library for the modified list of client cipher suites Enabling access to library for the modified list of compression methods Enabling access to library for the modified list of client point formats Enabling access to library for the modified list of client supported application protocols Enabling access to library for the modified list of client supported extensions Sending a client communication to the server using the edited client network protocol data S430

FIGURE 18

SYSTEM AND METHOD FOR MAINTAINING INTERNET ANONYMITY VIA CLIENT FINGERPRINT

CROSS-REFERENCE TO RELATED APPLICATIONS

This Application is a continuation of U.S. patent application Ser. No. 16/880,114, filed on May 21, 2020 (now U.S. Pat. No. 11,785,046), which claims the benefit of U.S. Provisional Application No. 62/850,890, filed on May 21, 2019, the contents of which are incorporated in their entirety herein by reference.

TECHNICAL FIELD

This invention relates generally to the field of network privacy, and more specifically to a new and useful system and method for maintaining anonymity via client fingerprint.

BACKGROUND

A device fingerprint, machine fingerprint, or application/browser fingerprint is information collected about a remote computing device for the purpose of identification. Fingerprints can be used to fully or partially identify individual users or devices even when persistent cookies (and also zombie cookies) may not be readable or stored in the browser, when the client IP address is hidden, and/or even if one switches to another browser on the same device. This may allow a remote application to compile long-term records of individuals' browsing histories even regardless of individuals' preference and in some cases despite basic attempts to avoid tracking. Some computer security experts consider the ease of bulk parameter extraction offered by web browsers to be a security hole.

As tracking techniques have become more sophisticated, and large data has been incorporated in fingerprinting, parameter extraction and fingerprinting has gone beyond web browsers. Thus, there is need in the fields of network security and individual privacy for a system and method of network communication that maintains the privacy of the individuals. This invention provides such a system and method.

BRIEF DESCRIPTION OF THE FIGURES

FIG. 12 is a schematic representation of generating a client fingerprint and determining a client type from the client fingerprint of one variation;

FIG. 18 is a flowchart representation of a method of applied to anonymizing TLS/SSL communication.

DESCRIPTION OF THE EMBODIMENTS

The following description of the embodiments of the invention is not intended to limit the invention to these embodiments but rather to enable a person skilled in the art to make and use this invention.

Figure 1:
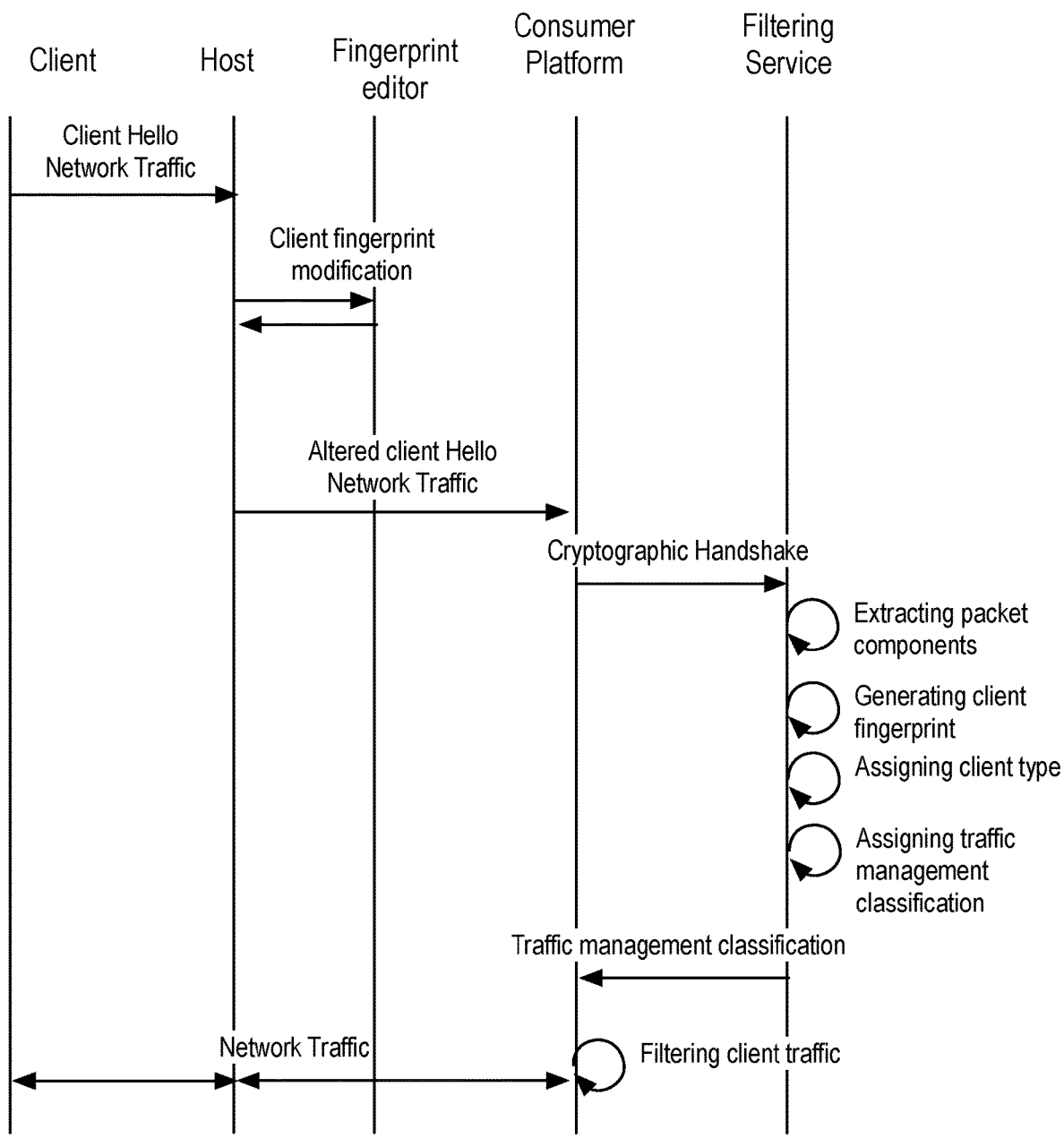
FIG. 1 is a communication flow diagram of an exemplary scenario of enabling client fingerprint anonymity with a system and method for filtering internet traffic.

1. Overview of Filtering Internet Traffic and Anonymizing Client Fingerprints A system and method of a preferred embodiment may anonymize client fingerprints and/or perform client fingerprinting in filtering or otherwise securing digital communications. The systems and methods described herein may be used in combination or independently. As shown in FIG. 1, a systems and methods maintaining anonymity may be used in connection with systems or methods for filtering internet traffic as described herein.

Figure 2:
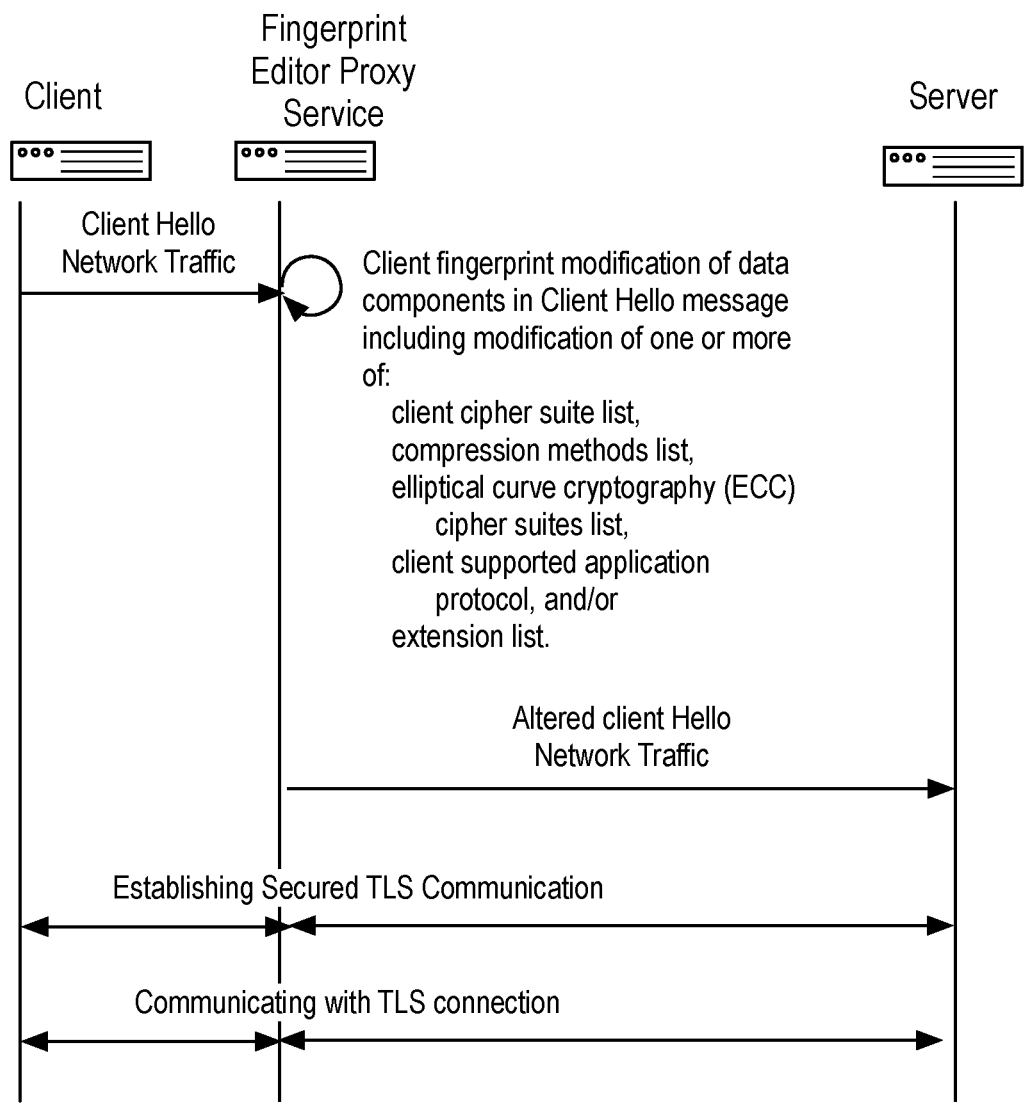
FIG. 2 is a communication flow diagram of an exemplary scenario of enabling client fingerprint anonymity using a proxy service.
Figure 3:
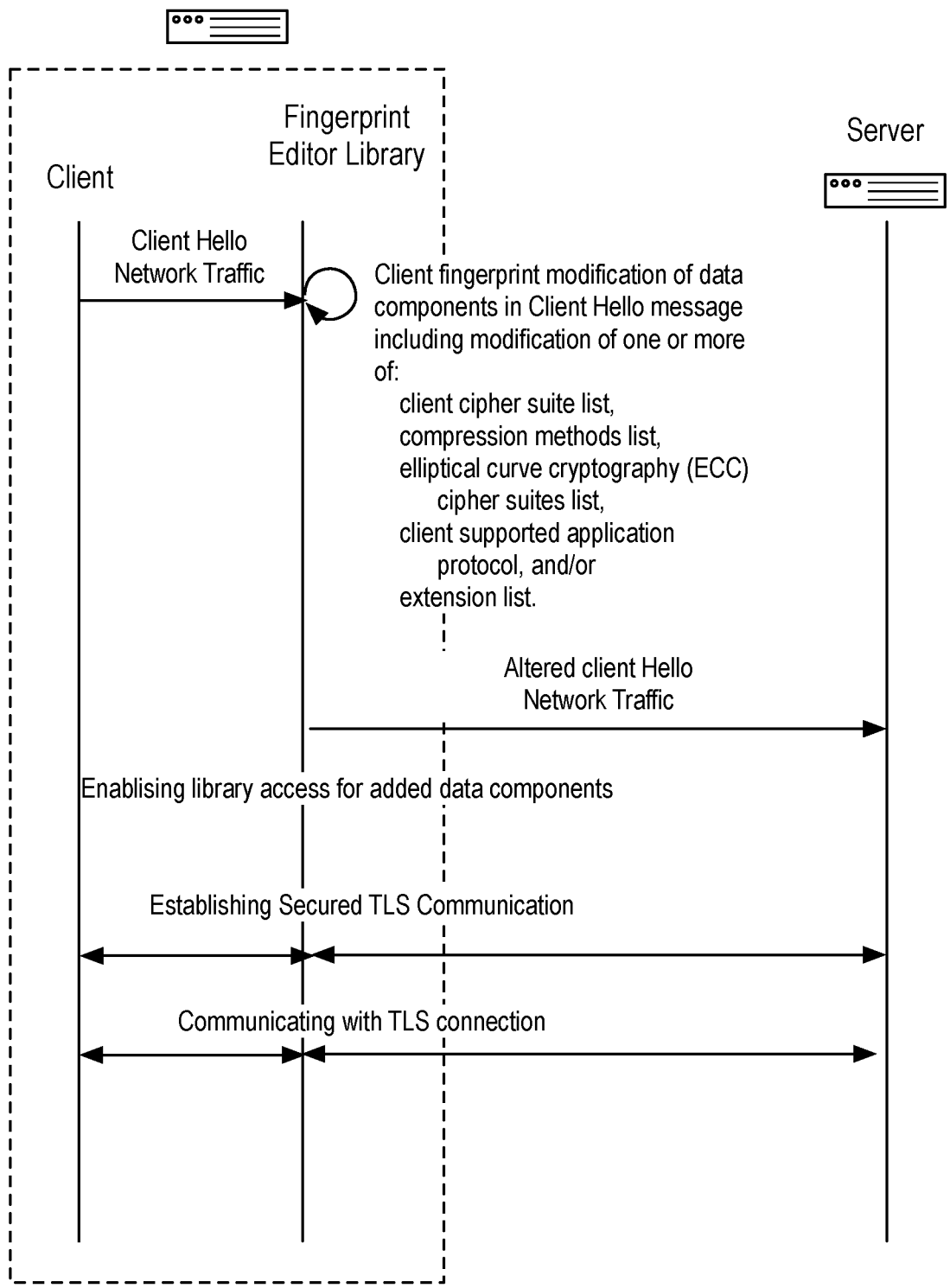
FIG. 3 is a communication flow diagram of an exemplary scenario of enabling client fingerprint anonymity using a library service.

In one implementation, a system and method for filtering internet traffic can facilitate maintaining anonymity of select client devices. For example, combined usage may be used to enable an incognito mode of interactions, which may be enabled by user selection or programmatically selected based on various conditions. Preferably, the system and method when applied to anonymizing a client involves the modification of data components in a handshake negotiation message of cryptographic protocol. More specifically, the Client Hello message of a TLS (Transport Layer Security) or SSL (Secure Sockets Layer) protocol can be modified to alter identifying characteristics. A system and method for modifying client fingerprint can be implemented as a proxy service as shown in FIG. 2. Alternatively, the system and method may facilitate modification of a client fingerprint on computing infrastructure/hardware locally accessible by the client such as through library integration as shown in FIG. 3, using a preloaded interrupt routine as shown in the exemplary implementation of FIG. 4.

In another implementation, a system or method for maintaining anonymity may be used with an outside, third-party implementation of a system or method for filtering internet traffic as shown in FIG. 1. In one implementation, the method for maintaining anonymity may be modified to generate an augmented client signature so that a method for filtering internet traffic can be configured to custom handling of the augmented client signature. This may enable modes of providing various forms of authentication that are embedded and possibly hidden within communication protocol management.

2. Overview of Filtering Internet Traffic

A method and system of filtering internet traffic of a preferred embodiment, functions to use an underlying security protocol used to secure internet traffic as a channel for client classification. A method and system preferably operates by receiving a client data packet, extracting a set of packet components from the client data packet, generating a client fingerprint from the client data packet, and assigning a client type using the client fingerprint. The client type may further include giving the client a traffic management classification and the method and system may further include filtering the client traffic dependent on the client traffic management classification.

The method and system can preferably classify or otherwise characterize a client and/or client type by examining lower level abstraction data from the client that is not necessarily controllable or as easily changeable by the client. Referring as an approximation to the network TCP/IP model, most client-controlled data is in the application layer. The method and system preferably utilizes client-identifying data from lower level layers (e.g. transportation layer) to generate a distinguishing client fingerprint. Many applications or scripts will make use of lower level libraries that manage and negotiate internet security such as that provided through TLS or SSL. Herein, reference will be made to TLS/SSL to imply that TLS or SSL may be used. Any version of TLS or SSL may be used and similarly derivative protocols or similar cryptographic protocols or other protocols may be used. The system and method can establish a client fingerprint from network traffic relating to such low level communication. In one preferred variation, the system and method leverages the client hello data packet used in the TLS (Transport Layer Security) or SSL (Secure Sockets Layer) handshake protocols. The hello data packet is preferably used in forming a client fingerprint based in part on the content, organization, and/or structure of the data packet. This client fingerprint may circumvent many client spoof and obfuscation techniques that are primarily application layer manipulations. The client fingerprint may then be utilized to determine and characterize the client type, thereby enabling appropriate management and/or filtering of the client traffic.

The system and method may provide a number of potential benefits. The system and method are not limited to always providing such benefits, and are presented only as exemplary representations for how the system and method may be put to use. The list of benefits is not intended to be exhaustive and other benefits may additionally or alternatively exist.

One potential benefit of the method and system is that a client fingerprint, as described herein, is sufficient to distinguish the client type. The client fingerprint may thus provide the necessary information to identify the type of actor that the client is, thereby enabling an appropriately desired response to the client. The client fingerprint may be used in identifying both good and bad actors.

Another potential benefit is that the client fingerprint may distinguish a client type with a high level of confidence. As the client fingerprint is determined from data components that are typically immutable through typical application development practices, the method and system may enable identifying a user reliably and consistently. Since a significant amount of information used to generate a client fingerprint comes from beyond the application layer, the ability for an actor to manipulate the client fingerprint becomes more difficult and therefore will more reliably reflect the true client type. Although not impossible to spoof, the client fingerprint provides a significantly more difficult detection technique for the client to manipulate as compared to current client detection techniques.

Another potential benefit is that using a VPN (Virtual Private Network) or a proxy, two of the most common ways a client may attempt to obfuscate its identify, does not hinder the method and system from distinguishing a client type. Since the data components utilized are significantly in the transport layer (e.g. TLS hello client), the client fingerprint is maintained and not altered by connecting through a proxy or utilizing a VPN.

Another potential benefit is that the method and system may also enable non-intrusive filtering. The system and method can preferably be implemented without needing to actively regulate incoming traffic, and instead may be passed the appropriate network traffic for analysis. Since a client type is identified at the point of connection with a server, client activity is not hindered by constant filtering or monitoring during activity. The client may be immediately admitted, rejected, or given appropriate access from the initial state, thereby not affecting client activity through constant monitoring. This may improve the performance of a computer-implemented service provided over the network. It similarly may reduce the computational resources needed for network monitoring.

As another potential benefit, the method and system may additionally afford a level of privacy for the client and for the activity of the client. Data required for the implementation of the method and system, although distinguishing the client, does not expose any user personal data or user personal activity that is passed along through the client such as information that may be exposed in HTTPS traffic (or other suitable types of application protocols). This may be particularly useful when the system and method are implemented as a service, and the user of the service does not want a third party having access to such information. Since no user data or user activity is used, data required for the implementation of the method and system may be freely transferred with minimal privacy concerns. For example, a third party system may supply the requested portion of network traffic (e.g. a TLS hello client packet) used in generating the client fingerprint without the third party system exposing sensitive client traffic. Therefore, the third party system can mitigate security and privacy risk of using such a network filtering service.

Figure 5:
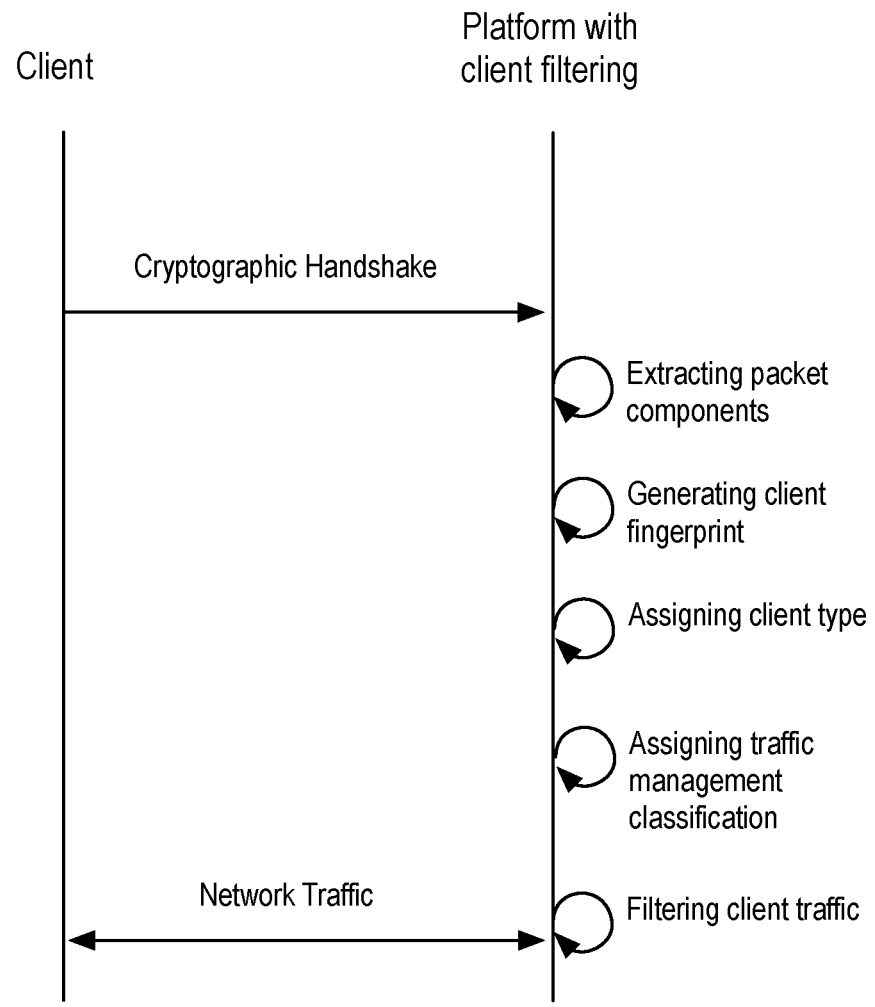
FIG. 5 is a communication flow diagram of one exemplary implementation of the system used within a computing platform.
Figure 6:
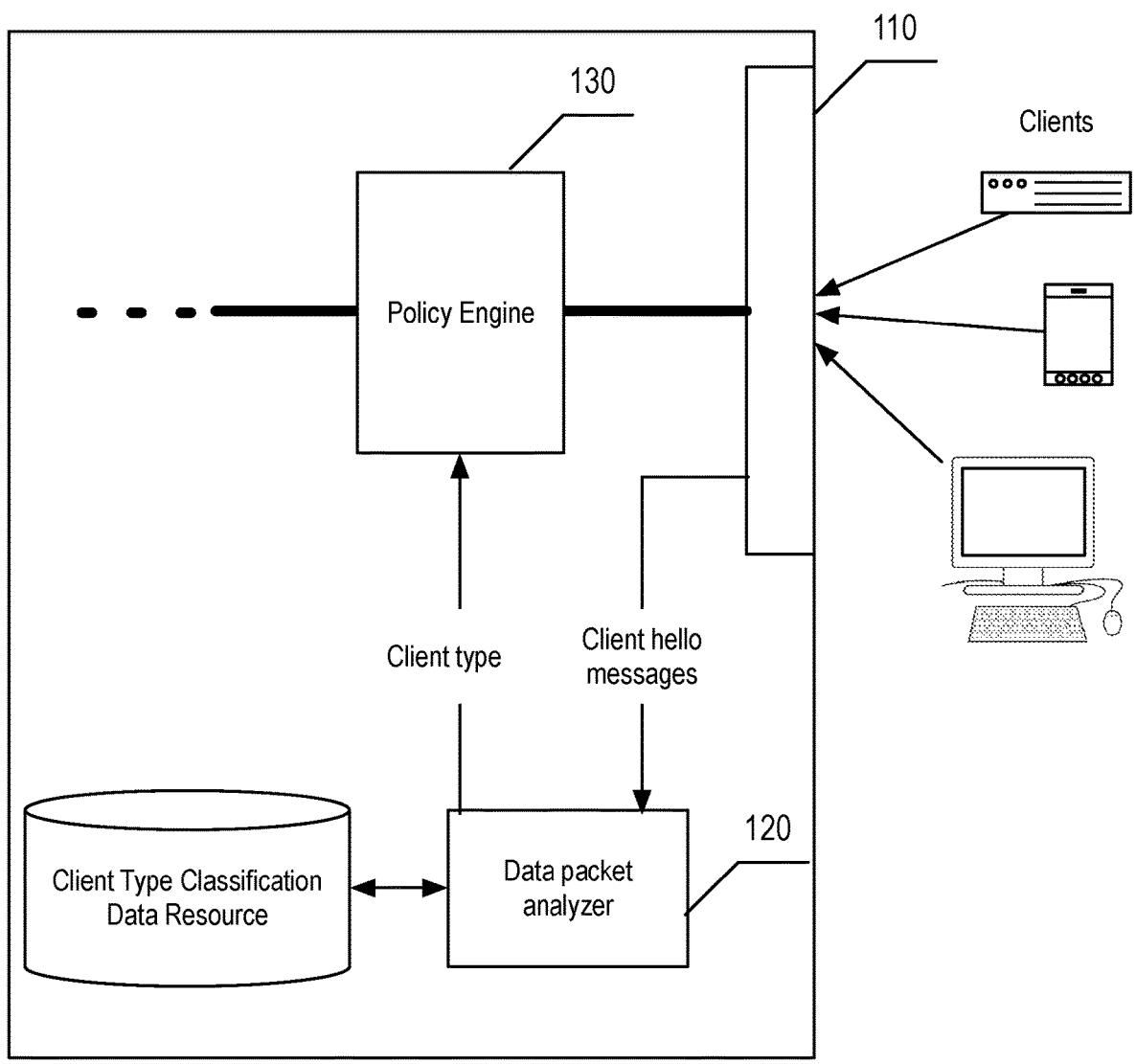
FIG. 6 is a schematic representation of a system of a preferred embodiment.

The method and system may have particular applicability for any person and/or organization that maintains a web service that has any type of concern over client traffic. A software application or service may apply an implementation of the system and method to address concerns related to security concerns (e.g. for banks, shopping sites), site misuse (e.g. bots taking over ticket sites, data mining websites), undesired traffic (e.g. PC users connecting to a mobile app site), and/or other suitable types of concerns relating to understanding and managing clients. As shown in FIG. 5, in one exemplary implementation of the system, a software platform may be configured to receive a client data packet, extract a set of packet components from the client data packet, generate a client fingerprint from the set of packet components, and assign a client type using the client fingerprint. Client type may be used to filter network traffic or take any suitable action. In one example, an online institution may use an implementation of the system to monitor the client type of clients connecting to the user-facing web services and appropriately regulate access by non-user clients as shown in FIG. 6.

Figure 7:
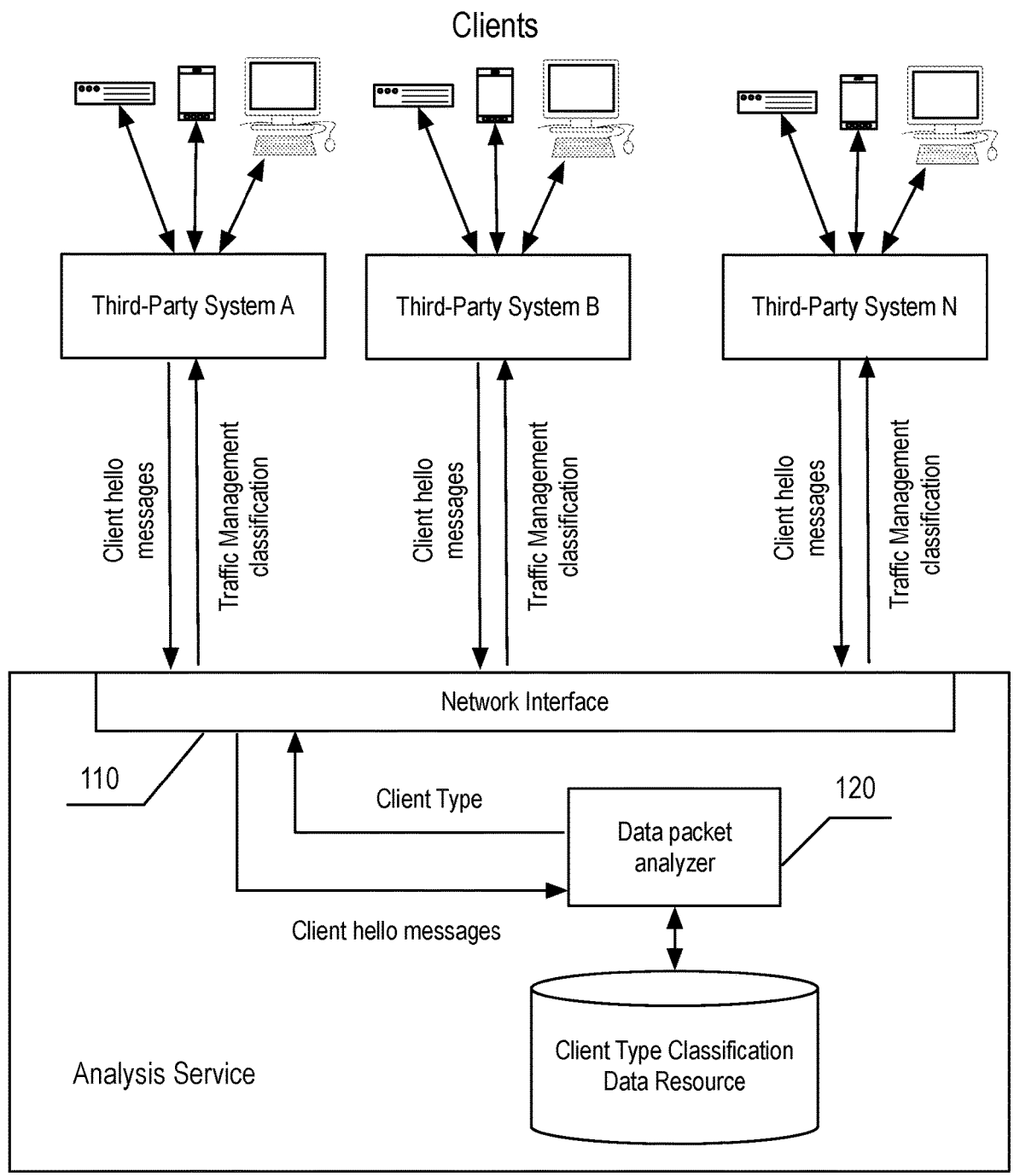
FIG. 7 is a schematic representation of a variation of the system as an analysis service.
Figure 8:
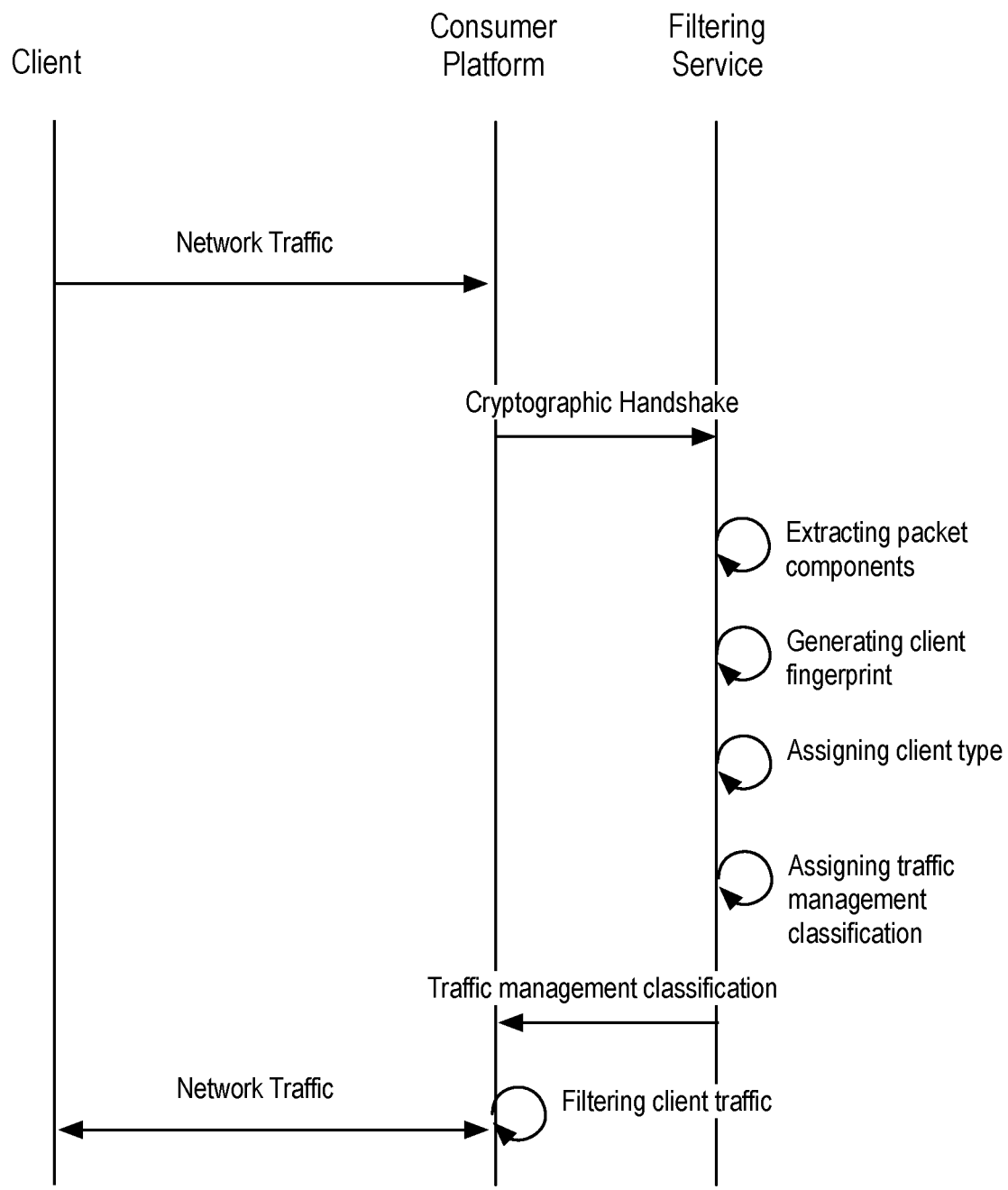
FIG. 8 is a communication flow diagram of exemplary implementation of the system as a filtering service.

Alternatively, the system and method may be implemented as a web traffic analysis and/or client filtering service. That is, a filtering service provider offered as an application programming interface (API) service may identify and/or filter client traffic to address security concerns, site misuse, and any other type of undesired traffic. The service is preferably offered as a multitenant service such that multiple businesses and applications can be consumers of the filtering service as shown in FIG. 7. A consumer could be any suitable type of entity with a computing infrastructure that has client traffic. Consumers could include platforms or services such as a bank, a shopping site, online auction site, online gaming site, ticket sales site, another API service provider, and/or any suitable type of platform or service. As shown in FIG. 8, in an alternative exemplary implementation of the system, a consumer will receive client traffic and specifically network traffic like a TLS/SSL hello client packet. The TLS/SSL hello packet will be passed to the filtering service for inspection. Having received the specified network traffic, the filtering service can similarly extract a set of packet components from the client data packet, generate a client fingerprint from the set of packet components, and assign a client type using the client fingerprint. The assigned client type can be passed back to the consumer. Additionally or alternatively, a recommended handling of the network traffic can be provided. For example, the filtering service can specify traffic handling suggestions such as indicating to treat it as legitimate traffic, block traffic, through a particular type of error for the network traffic, or to take any suitable type of action appropriate for the client type. In another example, an online ticketing agency may pass traffic to a filtering service to filter client traffic to identify and block automated bots from purchasing tickets. Alternatively, the filtering service may identify the bots for the ticketing agency enabling the ticket agency to take their own desired action regarding the bots.

Systems of a preferred embodiment may additionally include a client fingerprint database where data related to the various types of client fingerprints is managed. Data related to the client fingerprints may include a more general classification such as labeling as a particular type of computing device (e.g., specifying a brand/model of smart phone), activity data, and/or other suitable forms of data.

2.1 System for Filtering Internet Traffic

As shown in FIG. 6, a system for filtering internet traffic via a client fingerprint of a preferred embodiment can include a network traffic data interface 110, a data packet analyzer 120, and optionally a policy engine 130. The system can be used to regulate and manage network traffic. In alternative variations, the system may be used for the collection and monitoring of network traffic through a combination of the network traffic data interface 110 and the data packet analyzer 120.

As discussed above, the system preferably leverages the TLS/SSL handshake protocol during data packet analysis when determining a client type. An identified or classified client type may be used in determining how other client network traffic is managed by the policy engine 130. The system may be implemented internally within a computer-implemented system that has network traffic.

In an alternative variation, the system for filtering internet traffic via a client fingerprint is implemented as a client traffic analysis service that can be used by one or more third-party computer implemented systems. As shown in FIG. 7, a client traffic analysis service may include a network traffic data interface 110 (for receiving appropriate network data packets from external third-party systems) and a data packet analyzer 120. The analysis service can preferably communicate back to the appropriate third-party system results of the client analysis such that the third-party can enforce their own network traffic policy or perform any suitable business logic. The analysis service may be implemented as a multitenant computing platform. The multitenant platform may include a user account system that includes user database and/or data records. The user account system can additionally be used in facilitating authenticating and allowing external third parties with an account to supply appropriate network traffic data through the network traffic data interface 110.

The network traffic data interface 110 functions as a conduit for collecting the appropriate network traffic data packets for analysis. As mentioned above, the system may not require significant amounts of network traffic from a client to appropriately regulate all network traffic from a client. The network traffic data interface 110 as described may be directly integrated into the network traffic of a computing system and/or indirectly access appropriate portions of the network traffic.

Preferably, the data interface 110 is used to collect data messages exchanged as part of cryptographic protocol to establish and provide secure communications between a client device and a server. In this case, the server will typically be the computing system using the system and the client will be an external computing device trying to connect to the computing system. In particular, the negotiation phase of the cryptographic protocol can be used. A preferred variation is applied to TLS/SSL or other similar cryptographic protocols. In TLS/SSL, the client hello message (i.e., a ClientHello message) is preferably collected as the network traffic sample from a client. The Client hello is generally the initial message (i.e., data packet) sent by the client during the negotiation during the TLS/SSL handshake. The client hello message will generally include, announce, and/or otherwise specify supported protocol version info (e.g., current version number of TLS/SSL), a list of cipher suites supported by the client in order of client preference, and a random byte string. The client hello message may additionally include a list of suggested compression methods, a session ID, and if the client can use Application-Layer Protocol Negotiation. The client hello message may additionally include a list of supported application protocols and/or client-supported extensions. The client message may further include additional information.

In a first variation, the network traffic data interface 110 is integrated into the controller for network traffic of the operating system. In other works the network traffic data interface 110 may be directly integrated or built as part of the computing device and/or application/software used in receiving and processing network traffic from external client devices.

In another variation, the network traffic data interface 110 is an external system that operates in cooperation with another computing device and/or application/software used in receiving and processing network traffic from external client devices. In this variation, the data interface 110 is used to directly or indirectly access appropriate portions of the network traffic. The appropriate portions of the network traffic (e.g., the TLS client hello messages) may be sent from a system processing the network traffic. Alternatively, the data interface 110 may fetch the appropriate data packets.

In a variation for indirect access to the network traffic, the network traffic data interface 110 may be implanted as part of a network traffic analysis service. As such the network traffic data interface 110 may be an application programming interface (API). The API is preferably configured for requesting analysis of client network traffic. In one preferred implementation, a third party can submit a sample client hello packet through the API to the system. In response (either a direct response to the API request, provided through a callback URI, or supplied through any suitable mechanism), the system may provide a classification of the client hello packet (e.g., indicating the type of device and/or if it appears to be legitimate client traffic.

The data packet analyzer 120 functions to process a data packet and determine a client fingerprint and then optionally classify the fingerprint. The data packet analyzer 120 preferably includes one or more computer-readable mediums storing instructions (or other forms of configuration) that, when executed by the one or more computer processors, cause a computing platform to: extract a set of packet components from the client data packet; generate a client fingerprint from the set of packet components; and assign a client type to the network traffic using the client fingerprint. The data packet analyzer 120 preferably perform any operation or variation described below as it relates to extraction of components, generating of a client fingerprint and user of the fingerprint to assign a client type. The data packet analyzer 120 preferably these operations on a client data packet that is a client hello message received during negotiation during a transport layer security (TLS) protocol.

Configuration/instructions to extract the set of packet components preferably include configuration/instructions to extract identifying data from a client cipher suite list, a list of compression methods, the client point formats, the list of supported application protocols, and/or the list of client-supported extensions from the client hello message Configuration/instructions to generate the client fingerprint will preferably include configuration/instructions to encode the set of packet components into the client fingerprint as a character representation. Furthermore, configuration/instructions to encode the set of packet components will preferably include configuration/instructions to hash the client cipher suite list, hash the list of compression methods, hash the client point formats, hash the list of supported application protocols, and/or hash the list of client-supported extensions.

Configuration/instructions to assign the client type to the network traffic using the client fingerprint will preferably include configuration/instructions to select the client type from a database mapping client fingerprints to a classification of client type. The system and more specifically, the data packet analyzer 120 may further include a client type classification data resource. This can be a database or collection of databases used to map and/or classify a client fingerprint with a client type. In one variation, the client fingerprint can serve as an index used to query the data resource to determine a pre-established client type label. Alternatively, the data resource may be used as a model used in classifying the client fingerprint.

The policy engine 130 functions to manage the network traffic based in part on the output of the data packet analyzer 120. In general the policy engine 130 can is preferably a computer and/or circuit implemented device that includes configuration that when executed cause the policy engine 130 to permit network traffic restrict network traffic, and/or block network traffic with a client based on the client type output from the data packet analyzer 120.

2.2 Method for Filtering Internet Traffic

Figure 9:
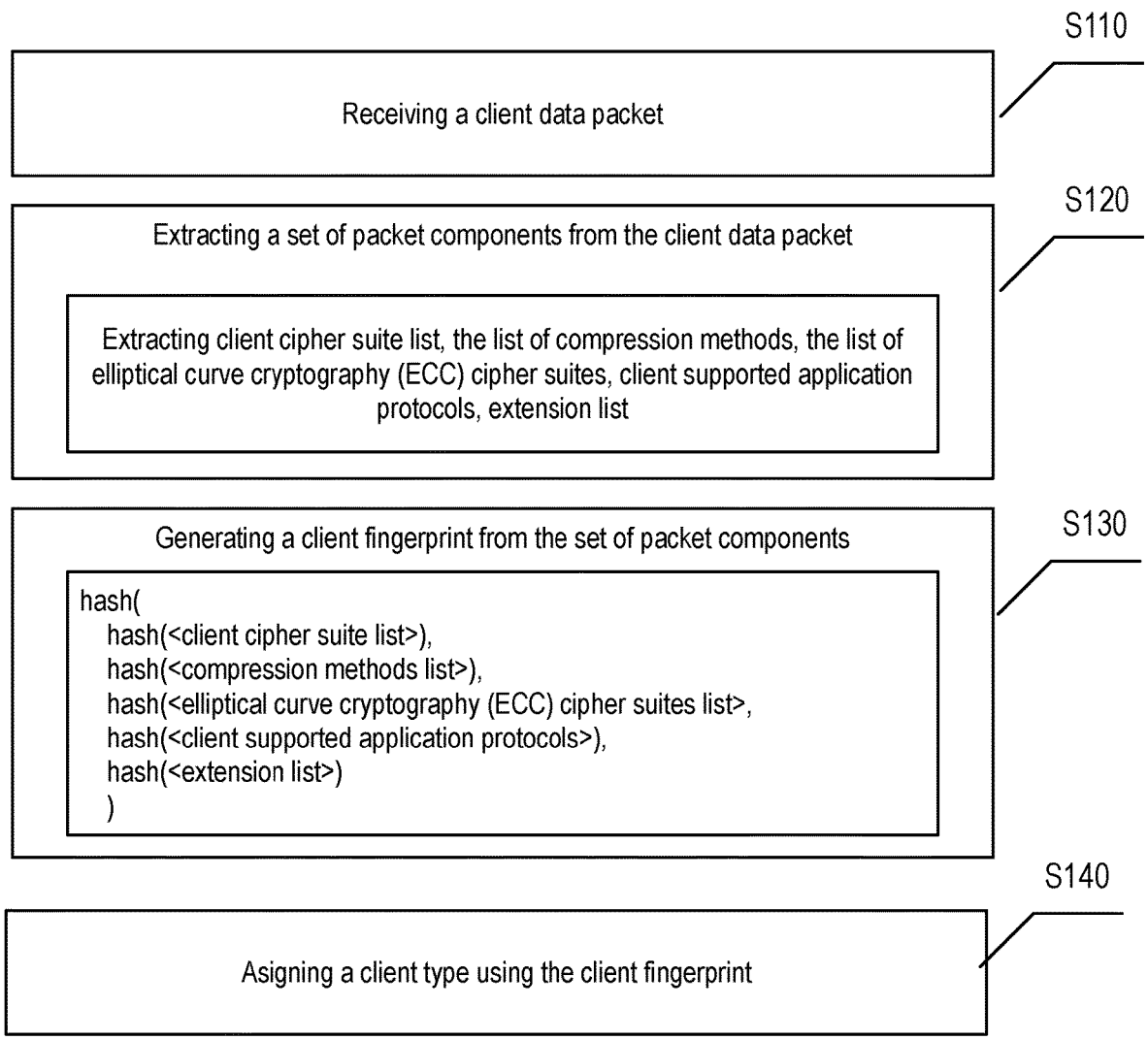
FIG. 9 is a flow diagram of a method of a preferred embodiment.
Figure 10:
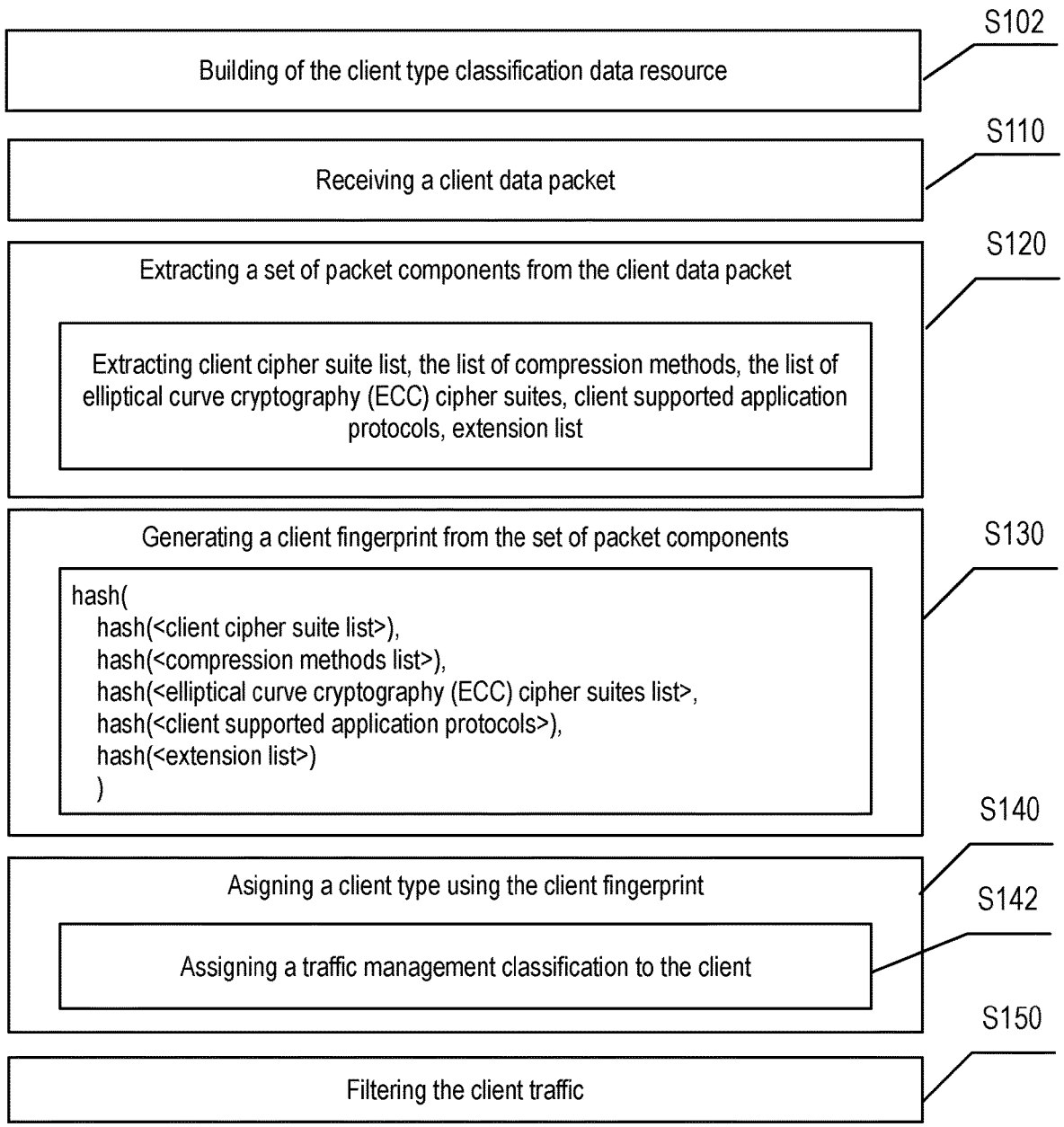
FIG. 10 is a flow diagram of a method of a preferred embodiment.

As shown in FIG. 9, a method of filtering internet traffic may include receiving a client data packet S110, extracting a set of packet components from the client data packet S120, generating a client fingerprint from the set of packet components S130, and assigning a client type using the client fingerprint S140. Assigning a client type may include giving the client a classification, which may include assigning a traffic management classification to the client S142 as shown in FIG. 10. The method may function in classifying and labeling network traffic by a set of clients. The method for example, may be able to more accurately identify the types of clients used to access a network-accessible service. The network-accessible service may further analyze the activity of those clients to understand how different clients behave. This client type classification is preferably resilient to attempts by a client to masquerade or present itself as a client type other than the one it actually is, thereby the method provides more accurate client type classification.

The method may additionally or alternatively function in classifying clients to enable filtering of client traffic. The method may further include filtering the client traffic depending on the client type such as by filtering on a traffic management classification associated with the client type of a particular client.

In one implementation, the method may be implemented as a network filtering solution within an application or service such as shown in FIG. 5. In such an implementation, the accessing of the client data packet may be performed directly on the network traffic with the network-accessible service. Similarly, the filtering of the traffic may be performed directly by the network-accessible service. In another implementation, the method may be implemented as a network filtering solution offered as a filtering service to one or more consumers of the service as shown in FIG. 8. The client data packets from the network traffic that are used for generating the client fingerprint may be supplied by an outside third-party. Similarly, traffic management classifications or other recommendations for network traffic filtering may be executed by the external systems. However, some variations may include a policy engine operable within a third party system to facilitate the filtering (e.g., a library or framework containing machine instructions configured for appropriately filtering traffic).

Preferably, the method is implemented in the context of a client data packet exchanged during the handshake negotiation of a cryptographic protocol. The client data packet more specifically is a client hello data packet communicated by the client device prior to establishing encrypted communication between the client and the server. The client hello data packet preferably serves as a client-provided description of client security configurations. The client security configurations can describe the types and/or versions of cryptographic protocols supported, the list of cipher suites, compression methods, supported application protocols, extensions, and/or other features. These various data packet components may be ordered by client preference and/or priority. In one preferred variation, the cryptographic protocol is a TLS/SSL protocol and the ClientHell( ) data packet is the TLS/SSL client hello message communicated when establishing or re-establishing a TLS/SSL session. Since the client data packet is exchanged during the handshake portion of the negotiation to establish a secure session, the data packets are exchanged in an unencrypted format (e.g., in plain text).

Figure 11:
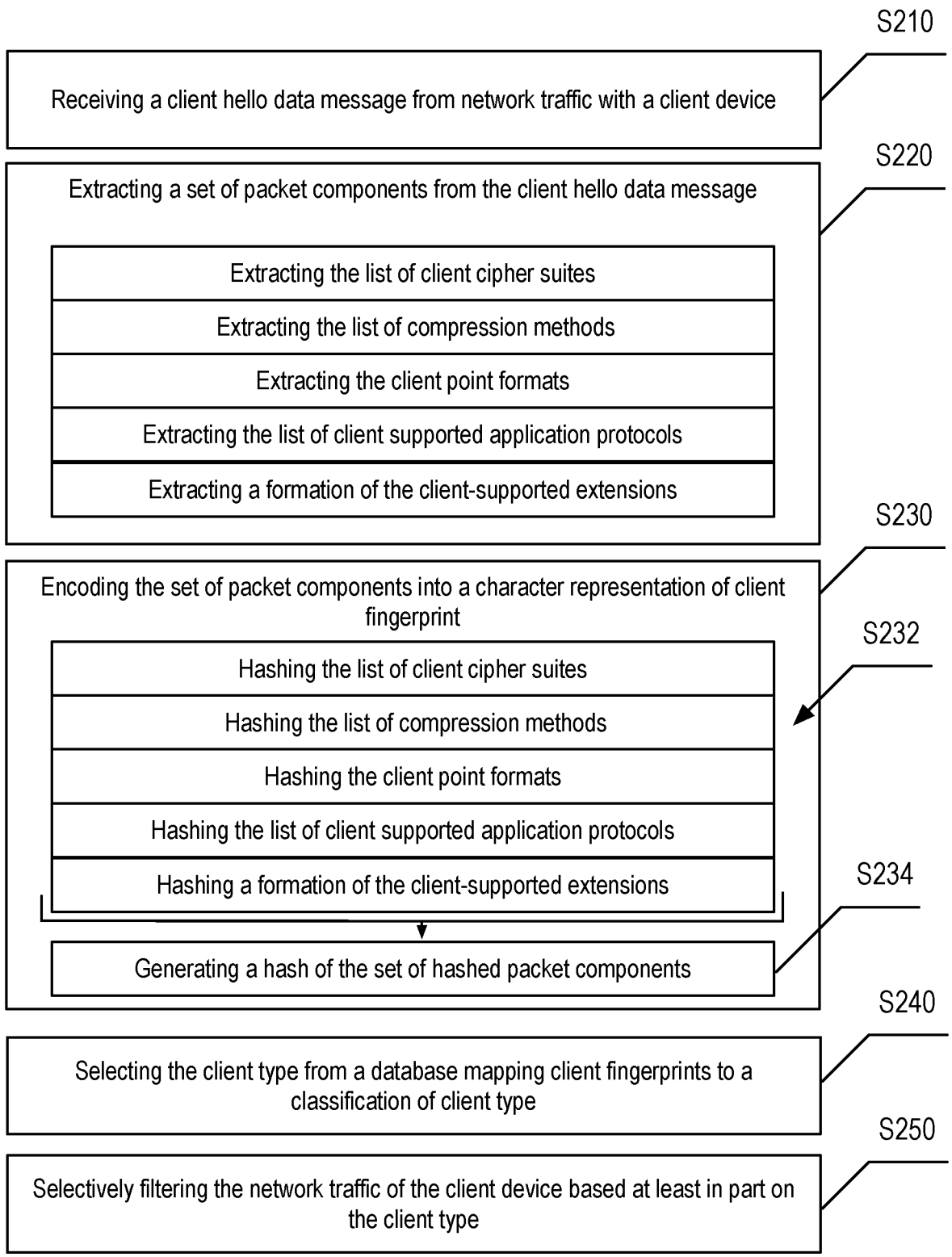
FIG. 11 is a detailed flow diagram of a method applied to TLS/SSL protocol.

In the variation where the method is implemented for use with a TLS/SSL protocol, client data packet is preferably a client hello message received during negotiation during TLS/SSL handshake protocol. Accordingly, the method may be implemented as shown in FIG. 11, which comprises of: receiving a client hello data message from network traffic with a client device S210; extracting a set of packet components from the client hello data message, where the set of packet components may include the supported version of TLS/SSL protocol, a list (e.g., a prioritized list) of client cipher suites, a list (e.g., a prioritized list) of compression methods, client point formats, list of client supported application protocols, and/or a list of client-supported extensions S220; encoding the set of packet components into a character representation of client fingerprint S230, which comprises of individually generating a hash of a set of packet components S232 (e.g., hashing each selected packet component) and generating a hash of the hash of the set of packet components S234 (e.g., hashing the hashes resulting from the S232); and selecting the client type from a database mapping client fingerprints to a classification of client type S240. The method may additionally include selectively filtering the network traffic of the client device based at least in part on the client type S250. More specifically, S232 and S234 is implemented by individually applying a hash operation to each of the set of packet components to generate a set of hashed packet components and then applying a second hash operation to the set of hashed packet components to generate the client fingerprint. The type of hash operations applied can be the same but may alternatively be different types of hash operations or other encoding operations. Generating the hashes of the set of packet components can include hashing the list of client cipher suites, hashing the list of compression methods, hashing the client point formats, hashing the list of client supported application protocols, hashing a formation of the client-supported extensions, and/or hashing any suitable packet component or feature. Alternatively, the client type information may be supplied or reported for appropriately action. The processes S210, S220, S230, S240 and S250 preferably correspond to and may include any variation described in S110, S120, S130, S140, and S150. Furthermore, encoding the set of packet components into the character representation of a client fingerprint may comprise of hashing the collection of hashed packet components as shown in FIG. 12.

Figure 13:
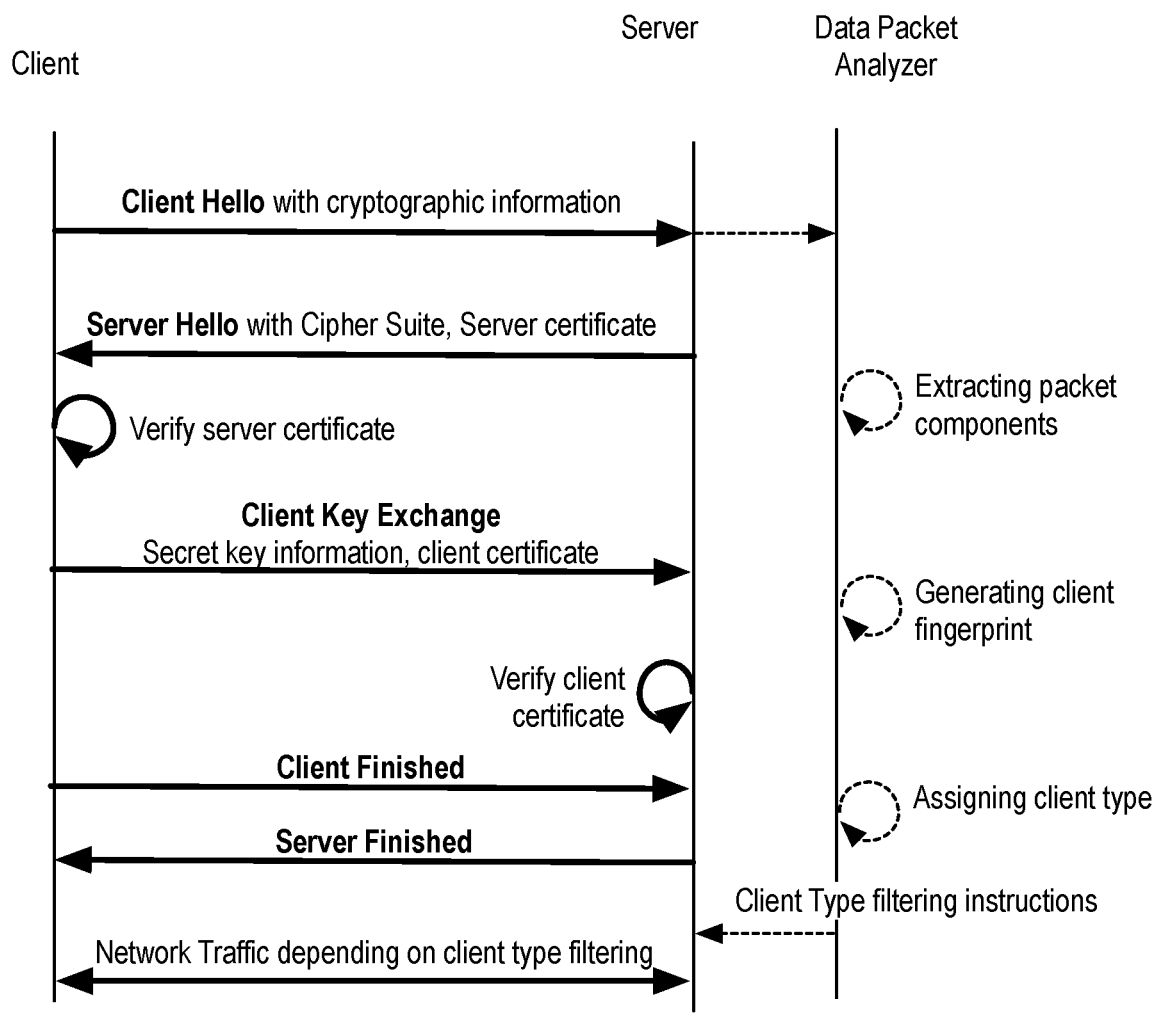
FIG. 13 is a communication flow diagram of exemplary implementation of the system as a filtering service.

The processing of the client hello may be performed in parallel to the TLS handshake protocol. As shown in FIG. 13, analysis and determination of the client type can performed independent and in parallel to the TLS handshake protocol, which includes the server receiving a client hello message containing cryptographic information of the client; sending of a ServerHello message from the server containing the cipher suite, server certificate, and optionally a client certificate request; receiving client key exchange message that includes secret key information encrypted with server public key; receiving the client certificate; verifying client certificate if required; receiving client finish message; sending server finished message; and then exchanging messages encrypted with a shared secret key.

Alternatively, the analysis of the client hello may be performed synchronous to the TLS handshake protocol such that the server response and actions during the TLS handshake protocol may be modified based on the client type.

Figure 14:
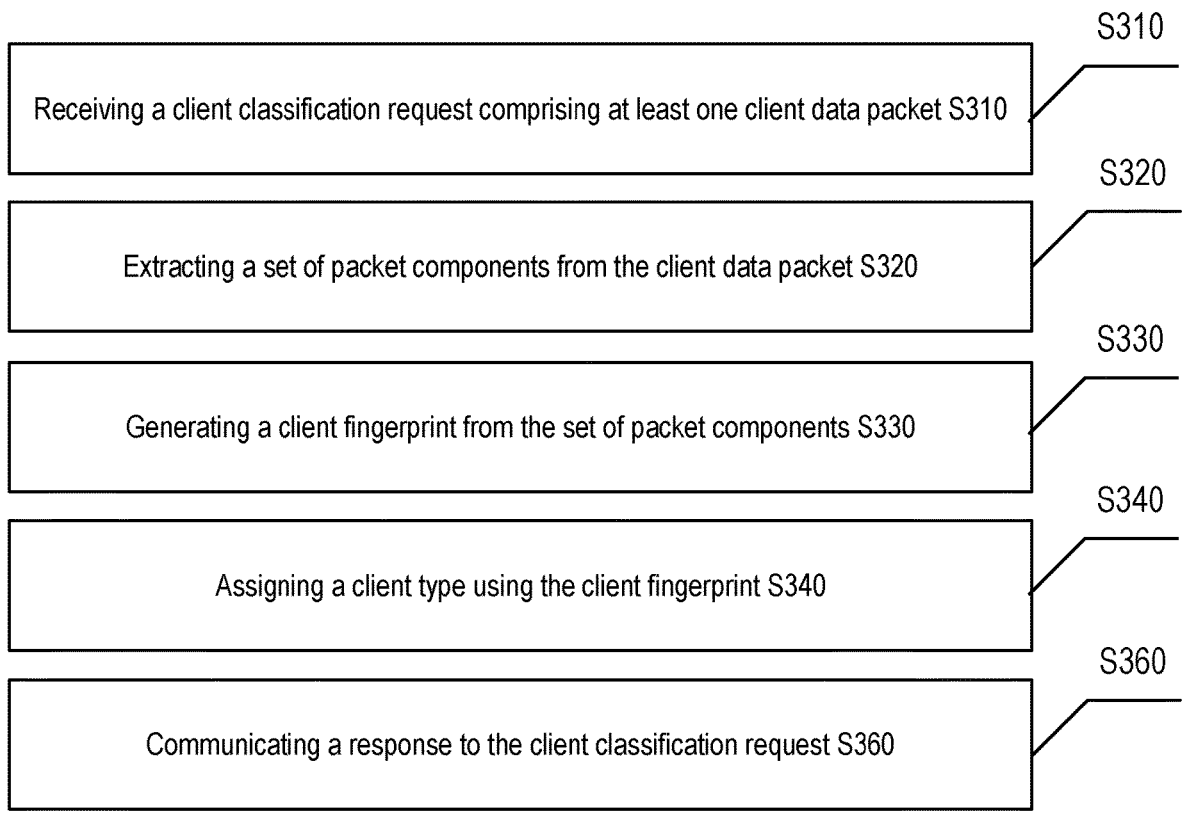
FIG. 14 is a flow chart representation of the method implemented as an analysis service.

In the variation where the method is implemented as an analysis service for analyzing and filtering of network traffic of external third-party systems, the method may be implemented as shown in FIG. 14, which comprises of receiving a client classification request comprising at least one client data packet S310, extracting a set of packet components from the client data packet S320, generating a client fingerprint from the set of packet components S330, and assigning a client type using the client fingerprint S340, and communicating a response to the client classification request S360. The processes S310, S320, S330, and S340 preferably correspond to and may include any variation described in S110, S120, S130, and S140. The response preferably includes the client type information. In one variation, the processes may be performed as part of a request and response sequence facilitated by an API of the analysis service (e.g., a REST API, GraphQL API, etc.). In another variation, the initial request may be submitted with a callback URI. The response can be supplied by sending a communication to the specified callback URI. Any suitable approach to receiving a request for client type analysis and supplying the results may alternatively be used.

The client fingerprinting technique provided by the method can serve as a reliable signal for the type of client. In other words, clients of the same type—that is to say client devices that are the same model of physical computing device with same or similar versions of an operating system, and/or using the same or similar versions of an application or software will generally yield the same or a similar client fingerprint. The method is preferably implemented having access to a data resource that maps client fingerprints to client type classifications. In some variations, the method can include building of the client type classification data resource S102 as shown in FIG. 10.

Block S102, which includes building a client type classification data resource, functions to generate a database or data model whereby a client fingerprint may be used to assigning or determining a client type. The client type classification data resource is preferably constructed from collecting the client fingerprints from a large number of clients and then appropriately assigning classifications and/or labels to the client fingerprints. In one variation, the client type classifications may be specifically tied to a client descriptor. A specific client descriptor may identify the model of the device, the version of operating system, the type and/or version of application or software functioning as the client. The client type classifications or at least a subset of classifications may be more general such as "legitimate client device", "computer-controlled client device", "scripted client device", and/or other suitable labels.

Building the client type classification data resource may include collecting a large volume of client data packets, processing them through the analysis of the process involving S120 and S130, and then labeling the resulting client fingerprints. The large volume of client data packets may include collecting greater than ten thousand, greater than hundred thousand, and/or greater than a million or even greater than ten or hundreds of million of client data packets.

In one variation, labeling (at least in part) may be performed manually. Preferably, labeling may be prioritized based on the number of occurrences, frequency of occurrences, rate of occurrences or other suitable metrics quantifying the client fingerprints detected in the sample of client data packets. For example, the client fingerprinting process may be configured such that approximately one hundred to a thousand different client fingerprints will generally be encountered across a large volume of client traffic (hundreds of thousands to millions of clients). And the more popular ones and/or rising client fingerprints can be labeled.

Additionally or alternatively, automated systems can facilitate the labeling. Such automated systems may include automatically labeling client fingerprints using a machine learning model, statistical model, and/or any suitable algorithmic approach.

As above, an automated system may determine when a client fingerprint should be labeled. The client fingerprints commonly encountered will generally be from legitimate traffic and may deserve labeling accordingly. Additionally or alternatively, a simple classification approach may be applied that labels client fingerprints based at least in part on the quantity of occurrences within a sample set.

Similarly, an automated process may be employed as part of building the client type classification data resources that includes detecting and/or notifying of new legitimate client types. For example, when a new device or application is introduced, a notification or alert may be generated. A new device may be detected by identifying an increase in the frequency of occurrence of a new client fingerprint.

As another automated process to facilitate to assist, building the client type classification data resource may include comparing a client fingerprint to a presented client type. Here the client type may be presented in another portion of communication from the client device. For example, the presented client type could be the stated user agent header. Patterns in user agent headers as they map to a client fingerprint may be used to automatically associate a client fingerprint with a user agent label. In some cases, a type of user agent may be associated with one or more expected client fingerprint. If the client fingerprint does not match the expected client fingerprint based on the presented user agent, then this can signal that a) a change in the user agent has introduced a new client fingerprint or b) the client is acting in bad faith by claiming a false user agent. In the case of a), the new client fingerprint may be monitored or selected for labeling. In the case of b) this may contribute to classifying the client type as one to monitor or flag for possible illicit behavior. For example, if one client fingerprint is frequently reported as different user agents it may be taken as a signal that the actual client type is one used for illicit use.

If implemented as an internal solution by a computer implemented service or application, the method may include monitoring activity originating from a client and applying a classification based at least in part on client activity with the service or application. Monitoring activity can be used in detecting patterns in higher-level activity from a client such as types of actions performed, amount of activity, detecting and/or classification of activity associated with human activity (e.g., user interface interaction). Preferably, once a client fingerprint is confidently associated with a client type classification, inspection and/or analysis of user activity can be avoided, and the client fingerprint can be sufficient. Such analysis may be useful when initially assigning a classification.

In variations where the method is not implemented as an internal solution but is provided as a service, the method may include receiving client labels for client devices from third-party systems. In other words, the systems using the analysis service may report their own classification of particular users, which may be used to update the client type classification data resource for the client fingerprint that was detected for that client device. For example, if a user account from a client device was determined to be performing fraudulent or undesired activity with a computer service, then that client fingerprint may be flagged accordingly. In some cases, a single occurrence may not be sufficient for updating a client type. However, if an established pattern is detected then the client type associated with a client fingerprint may be updated.

Block S110, which includes receiving a client data packet, functions in acquiring appropriate client related network traffic. The client data packet is preferably from network traffic with a client device. The client data packet preferably includes communication protocol information regarding the client. Preferably, the client data packet includes client specific information that may distinguish a client. The client data packet may optionally not include application-specific functional data that may be part of HTTP/S traffic. Though, in some variations, such data may be collected. In preferred variations, the client data packet includes at least part of the initial client/server handshake used in cryptographic protocols, but may include additional information. The initial client/server handshake in a cryptographic protocol is generally part of a lower level implementation that is more challenging to manipulate. The initial handshake additionally may have a number of components that are more accessible as the cryptographic communication has not been established at that point and the data is not encrypted. The client data packet is preferably a client hello message received during negotiation during a cryptographic protocol. As discussed above, the cryptographic protocol is preferably a TLS/SSL protocol. In a preferred implementation, the client data packet is a TLS client hello message (or SSL client hello message) from the TLS handshake protocol between a client and server to establish a secure connection. The client hello message originates from the client.

Preferable implementations of the client data packet include any version of the TLS (or SSL) client hello message. See, e.g., "The Transport Layer Security (TLS) Protocol Version 1.2," RFC 5246, August 2008. The client hello message may contain the current version number of TLS (or SSL), a list of cipher suites supported by the client in order of client preference, and a random byte string. The client hello message may include a list of suggested compression methods, a session ID, and if the client can use Application-Layer Protocol Negotiation. The client hello message may additionally include a list of supported application protocols and/or a list of client-supported extensions. The client message may further include additional information.

The client data packet may additionally or alternatively include a client data packet other than the TLS or SSL client hello packet. The client data packet may comprise of multiple data packets. For example, the client data packet may include all the data packets of the client side of a TCP handshake for establishing a connection.

Receiving the client data packet may be performed by directly accessing the network traffic to a server. Alternatively, receiving the client data packet may include receiving a client classification request comprising at least one client data packet, wherein the analysis of network traffic by a client is performed for external network traffic as discussed above. In some variations, receiving of client data packet related data is performed in substantially real-time. For example, the client data packet may be accessed and communicated for analysis in response to receiving the client data packet from the client. In some variations, receiving of client data packet related data may be performed asynchronous to the actual client network traffic. For example, analysis of prior network traffic can be performed to assess the client types that have historically accessed a computer-implemented service.

Block S120, extracting a set of packet components, functions in extracting client specific information from the client data packet in order to generate a client fingerprint. Extracting a set of packet components S120 may include extracting, reading, or otherwise accessing one or more components from the client data packet. Preferably, a number of properties are extracted and used in generating the client fingerprint.

Extracting a set of identifying data S120 may extract client data in a non-intrusive way. Preferably, extracted identifying data may be client specific data that can be used to identify the client but without extracting client activity or message data. In this way, a client fingerprint can be generated without needing to access private information, personally identifying information, and/or other private or sensitive data.

The client data packet may include a number of fields. A packet component can be information from one of these fields such as the value of a particular field. In some variations, multiple packet components (or data fields of the client data packet) can be extracted and used. Preferably, the particular packet components that are extracted are preconfigured. The packet components are preferably extracted to preserve their value but also how they are presented (such as the order), as those can be client-identifying signals.

A packet component may include a list of items. For a packet component that is a list of items, extracting a set of packet components S120 preferably includes extracting the order of the list of items. If extracting a set of packet components S120 is applied to a list of items, the order of the items is also preferably extracted by block S120. Depending on the preferred implementation, the order of items may be included in the original packet component or comprise a distinct packet component. Extracting a set of identifying data S120 can include extracting identifying data from the client cipher suite list, the list of compression methods, the list of elliptical curve cryptography (ECC) cipher suites, client supported application protocols, extension list, and/or other properties of the packet(s). For each of these components of identifying data, the specification, the order of the list, the number of items in a list, and/or any suitable property of the particular packet component can be used.

In variations wherein the client data packet is a TLS or SSL client hello message, extracting a set of packet components S120 may include extracting the client cipher suite list. The client cipher suite list is a list of the cipher suites encryption algorithms that the client can implement in order of client preference.

In variations wherein the client data packet is a TLS or SSL client hello message, extracting a set of packet components S120 may additionally or alternatively include extracting the list of compression methods. The compression methods are hashing algorithms that may be implemented to reduce the size of information sent back and forth between the server and client.

In variations wherein the client data packet is a TSL or SSL client hello message and the list of cipher suites includes any elliptical curve cryptography (ECC) cipher suites, the client hello message may additionally include a list of ECC cipher suites the client can support and the point formats the client can parse. In these variations, extracting a set of packet components S120 may additionally or alternatively includes extracting the client point formats.

In variations wherein the client data packet is a TSL or SSL client hello message and the client hello message includes an Application-Layer Protocol Negotiation Extension (ALPN), the client hello message may additionally include a list of client supported application protocols (e.g. Http/2). In this variation, extracting a set of packet components S120 may additionally or alternatively include extracting the list of client supported application protocols.

In variations wherein the client data packet is a TSL or SSL client hello message extra, the client hello message may additionally include a list of client-supported extensions (e.g. server name indication). In these variations, extracting a set of packet components S120 may additionally or alternatively include extracting the list of client-supported extensions.

In variations where the client data packet is a TLS/SSL client hello message, the possible data packets that may be extracted could include a combination of a list of client cipher suites, a list of compression methods, client point formats, a list of client supported application protocols, a list of client-supported extensions, and/or other fields from the hello message. Different variations may use different combinations of packet components and/or alternative packet components.

Additional packet components may be added, removed, or replaced. Examples of other packet components may include: client browser information, detection of a client from a known VPN IP, and client TOR utilization. The method may additionally be implemented for older protocols. For example, on a private network still running older communication protocols, the method may enable building an application list off of the Next Protocol Negotiation (NPN) extension format instead of ALPN, as described above. Additionally, the client announced client type such as the user agent header in an HTTP/S communication may additionally be collected, which may be used for comparison when determining how to handle the client traffic.

Block S130, which includes generating a client fingerprint functions to create a distinguishing client fingerprint. The client fingerprint may or may not be unique. Although not necessarily unique, the client fingerprint is preferably sufficiently distinct as to enable distinguishing between client sub-groups (e.g. particular application users, browser users, particular mobile device users, particular operating system users, programming language connection, bots, and the like).

Generating a client fingerprint S130 preferably encodes the set of packet components into a character representation, heretofore referred to as the client fingerprint. In other words, generating the client fingerprint can include encoding the set of packet components into a client fingerprint as a character representation. The character representation can be a string of alphanumeric characters or a number. Specifically, generating a client fingerprint preferably includes: for each of the extracted packet components, encoding the packet component. In some variations, generating a client fingerprint can additionally include encoding the encoded packet components such that a singular string or number is produced.

Any suitable encoding process may be used. Encoding will preferably be hashing a specified organization of the packet component. In one preferred variation, encoding includes hashing of a representation of the values for a packet component. Accordingly, in one preferred variation, the client fingerprint is the result of, producing a set of hashed packet components by individually applying a hashing process to each packet component in the set of packet components, and producing the client fingerprint by applying a combined hashing process to the set of hashed packet components as shown in FIG. 12. The combined hashing process preferably functions as an outer-hash layer to a collection if individually hashed packet components. The applying a hashing process to a set of individually hashed packet components will preferably create a single meta-hash of all the hashes acting as signals of the client type. The combined hashing process can additionally generate a substantially consistent client fingerprint that can be used as an index into a client type classification data resource. In one implementation, the data resource includes a database of blacklisted and/or whitelisted clients that is indexed by the client fingerprint. Selecting a client type can include searching the database using the single meta-hash resulting from the combined hashing process. In the variation with a blacklist and/or whitelist databases, finding the meta-hash value in one of the databases can indicate if the client is permitted (whitelisted) or prohibited/blocked (blacklisted). With a combined hashing, any client fingerprint changes to any of those subsignals (the packet components) automatically rolls up observably into calculation and generation of the meta-hash client fingerprint. This preferably enables detecting a change in any one of the packet component subsignals and treat it as a unique fingerprint to which policy rules can be configured and applied This approach can also make the process for managing how clients are handled straight forward since adding a client fingerprint (the meta-hash) to a database can serve to assign the client type and network management of a client. For example, if a client fingerprint "FEF417DFB97DF4EC8715382CE80770A1, which is combined hash, is found to be a known python variant that should be blocked, then that client fingerprint hash can be added to the blacklist database (or labeled as a blacklisted client fingerprint).

The order of and process for applying the hashing process is preferably configured to make generation of the client fingerprint to be reproducible. Hashing or applying a hashing process preferably characterizes the execution of a hash function that maps data of an arbitrary size to a set of values (generally fixed-size values). The output from a hash function can be referred to as a hash or hashed value or simply hashes. In one preferred example, an MD5 hashing algorithm is implemented in generating a client fingerprint S130. Alternatively, any type of compression or hashing algorithm or approach may be implemented in generating a client fingerprint S130. Alternatively, the client fingerprint can be a data model representing each encoded packet component. The encoding process and data modeling of the client fingerprint can have any suitable other variations.

Specifically, the generating a client fingerprint S130 can include hashing the client cipher suite list, hashing the list of compression methods, hashing the client point formats, hashing the list of client supported application protocols, hashing a list of the client-supported extensions, and/or hashing other suitable packet components. The list can be a sorted order of elements, the presented order from the client data packet, or any suitable organization or formation. In one exemplary variation, hashing a list of the client-supported extensions can be characterized as hashing a formation of elements from the list of client-supported extensions. In other embodiments, the client fingerprint can include other elements derived from the handshake including any attributes or parameters that accompany the network traffic passing back and forth between the client and the server. The approach is not limited to any particular handshake protocol or to any attribute of a network session and can be readily adapted as handshake protocols are modified and extended.

In generating a client fingerprint S130, the set of packet components may be hashed in a specific way to give the client fingerprint certain properties. One property of the client fingerprint may be that each packet component from the set of packet component may be distinguished within the client fingerprint, such that subsections of the client fingerprint may be utilized independently. For example, the client cipher suite list of the client fingerprint may be distinct from the client supported application protocols list on the same client fingerprint. Another property of the client fingerprint may be allowing comparison of ordered and unordered client fingerprints. Client fingerprints may be compared to each other and determined to be "identical" in content but different in the order of the content. In one variation, the client fingerprint may be a data model wherein there are two or more fields. Those fields could be configured in a variety of ways. In some variations, the fields may be based on packet component content (e.g., the values presented for a particular property of a client hello message) and packet component order (e.g., the order in which a list of elements are presented for a particular property of the client hello message). A content and/or order property could be specified for one or more different packet components. For example, two clients can contain the same cipher suites in their cipher suite list, but the order of preference of the cipher suites is different for each client. These distinctions may be determined from comparison of the two client fingerprints. This analysis of the client fingerprint may be implemented for the entire client fingerprint. Additionally, this analysis may be implemented for any one, or some, client fingerprint subsections.

Block S140, which includes assigning a client type, functions in demarcating the client, dependent on the client fingerprint. Assigning the client type will preferably assign the client type to the network traffic of the associated client. Assigning the client type is preferably performed based, at least in part, on the client fingerprint. Various approaches may be used in assigning the client type. The client type may be determined based on identifying a classification associated with the client fingerprint, by assigning a classification based on the combination of properties and/or distinguishing characteristics of the client fingerprint, by detecting patterns of occurrence of a client fingerprint, and/or other suitable approaches.

As discussed above, the method may involve building a client type classification data resource that can be used in assigning a client type for a given client fingerprint. In some variations such a data resource is built through collection of data. In some variations, such a data resource is already provided. A classification may be established between the client fingerprint and higher-level client property (e.g. IOS user) using a determined mapping. For example, creating a mapping of client fingerprint and a client classification may be formed through initial monitoring of network traffic and then continuously maintained and updated for new client fingerprints. Additionally or alternatively a classification may be "learned" (e.g. through machine learning or correlation analysis). Other features of network traffic like application layer traffic such as HTTPS traffic, application-specific actions (e.g., type of client behavior with an application), and the like may be used in classifying the client fingerprint. For example, after detecting a number of clients as performing fraudulent actions, their corresponding client fingerprints (if common amongst them) may be classified as a fraudulent-actor client. If a connection cannot be determined assigning a client type S140 may give an "unknown" classification. An "unknown" classification may be flagged for subsequent monitoring or inspection. If a human or computer system later flags the client (positively or negatively), then that data may be used to inform the subsequent assignment of a client type of a similar or matching client fingerprint.

In one variation involving identifying a classification associated with the client fingerprint, the client fingerprint can be used in querying or inspecting a client type classification data resource. In one variation, this can include selecting the client type from the client type classification data resource using the client fingerprint as the query or index into the data resource (e.g., database). The client type classification data resource can be a database mapping client fingerprints to a classification of client type. In the variation, where the client fingerprint is a character encoding, the client fingerprint can serve as the index used to query the database. If that client fingerprint has an existing classification, querying the index will yield a client type classification.

As another variation, assigning a client type may include assigning a classification based on the combination of properties and/or distinguishing characteristics of the client fingerprint. Assigning a client type may include classifying the client (into one or more classifications), scoring the client (e.g., rating of validity), tagging client properties associated with the client fingerprint, and/or characterizing in any suitable manner. This variation is preferably used when the client fingerprint is a data model representing various properties or signals related to the client type. In one preferred variation, assigning a client type S140 may include giving the client a classification.

Classifying a client type may additionally assign multiple classifications and/or scores. The classifications may overlap (e.g. browser type: chrome and operating system: iOS), be sub-types (e.g. operating system: Android, Android version: 9.0), and/or serve as complementary client types (e.g. a numerical score for each fingerprint subsection). In other embodiments, the hashing of attributes can be done in multiple tiers, where the overall fingerprint will differ where any of the sub-fingerprints at a particular tier differ. Note that client traffic can advantageously be aggregated based on overall fingerprint or based on the fingerprint at a particular tier or based on a particular sub-fingerprint.

Assigning a client type S140 may additionally include multiple levels of introspection of the client fingerprint, which functions to assign client type by similarities of individual hello client packet components. As discussed above, some variations of the client fingerprint may preserve encodings of each packet component. If the high-level client fingerprint (e.g., an encoding factoring in all components) does not satisfy a direct mapping to a client type, then individual component level analysis can be performed.

Giving the client a classification may include assigning a traffic management classification to the client S142. A traffic management classification functions to notify the host or the filtering service provider on how to manage the client. Assigning a traffic management classification S142 may thus tag the client for filtering the client traffic. Assigning a traffic management classification S142 preferably assigns at least one traffic management classification to the client. In some variations, the client type identified for the client fingerprint may incorporate information to serve as the traffic management classification—in other words, the client type may suffice or serve as an indicator for traffic management.

One preferred traffic management classification is blacklist. Assigning the blacklist classification to a client may suggest that all client traffic should be blocked. A database or list of blacklisted client fingerprints can be maintained and used to directly assign the blacklist client type to a client fingerprint. Another preferred traffic management classification is whitelist. Assigning the whitelist classification may suggest that all client traffic should be left unrestricted. Another preferred traffic management classification is "unknown". A database or list of whitelisted client fingerprints can similarly be maintained and used to assign the whitelist client type to a client fingerprint. Assigning the unknown classification to a client may suggest that the client fingerprint is not sufficiently recognizable to match any other traffic management classification.

Additional and/or alternative traffic management classifications may be implemented as desired. Examples of additional classifications may include: suspicious client (e.g. suggesting the client traffic should be monitored), bot client (e.g. suggesting the client is not a person and the host should act accordingly), limited access client (e.g. suggesting the client traffic should be throttled or limited in accessibility). Traffic management classifications may be host specifically implemented. For example, a guest user classification may be implemented for a bank server. A guest user flag may suggest that the bank server should limit the number of transactions the client can make and/or the limit bank data the client can access, and/or throttle the client traffic.

In one variation, assigning a client type may include comparing a client fingerprint to a client-presented client type. Additionally or alternatively, this may include comparing an assigned client type to a client-presented client type. These variations function to assess if the client is honestly announcing the type of client in other communications. The client-presented client type can be the user-agent header value used during HTTP/S communications, but could alternatively be any suitable communication where the client makes a claim as to the type of client device it is. In some cases, a type of user agent may be associated with one or more expected client fingerprint. If the client fingerprint does not match one of the expected client fingerprint based on the presented user agent, then this can signal that a) a change in the user agent has introduced a new client fingerprint or b) the client is acting in bad faith by claiming a false user agent. In the case of a), the new client fingerprint may be monitored or selected for labeling. In the case of b) this may contribute to classifying the client type as one to monitor or flag for possible illicit behavior. Comparing of client fingerprint and/or client type to a client-presented client type may be used in updating or adjusting the assignment of a client type. For example, if the comparison indicates there is a mismatch then the client type may be set to indicate as such (e.g., possible bot). Comparing of client fingerprint and/or client type to a client-presented client type may additionally or alternatively be used in updating or adjusting the client type classification data resource such that it may be used to alter the assignment of a client type of subsequent client fingerprints.

The method may further include filtering the client traffic S150. Filtering the client traffic S150 functions in managing the client traffic based on the traffic management classification(s) of the client. Filtering client traffic preferably includes filtering the network traffic from the client. Filtering the client traffic S150 preferably manages the client traffic as per the suggestion of the traffic management classification (e.g. block blacklist classified client traffic and not impede whitelist classified client traffic). Specifically, filtering the network traffic of a client will include limiting and/or preventing network traffic from a client because of a client type indicative of some concern. Additionally or alternatively, filtering the network traffic of a client may include expressly permitting network traffic from a client (wherein by default network traffic may be denied or limited). Filtering of the network traffic may be performed based on blacklisting and/or whitelisting of client types and/or client fingerprints. Alternatively, filtering the client traffic S150 may manage the client traffic different to the traffic management suggestions. For the previous bank example, filtering client traffic S150 of the guest user client may be time dependent, and the bank server may not throttle the client traffic activity during non-peak activity hours. Any suitable traffic enforcement policy may be applied.

3. Overview of System and Method for Maintaining Internet Anonymity

A system and method maintaining internet anonymity through client fingerprint management of a preferred embodiment function to obfuscate and/or obscure the identity of a client in network communication. In particular, the system and method function to augment the client fingerprint as may be generated from analysis of lower level network traffic. The system and method can preferably be applied for use with outside systems that utilize client-identifying data from lower level layers (e.g. transportation layer) to generate a distinguishing client fingerprint. For example, many applications or scripts will make use of lower level libraries that manage and negotiate internet security such as that provided through TLS (Transport Layer Security) or SSL (Secure Sockets Layer). Herein, reference will be made to TLS/SSL or simply TLS to imply that TLS or SSL may be used. Any version of TLS or SSL may be used and similarly derivative protocols or similar cryptographic protocols or other protocols may be used. The libraries and frameworks used to facilitate TLS (or SSL) may be characterized through protocol message analysis. In particular, the client hello message during the initial handshake can be used to characterize the type of device of a client through the various components of the client hello message. The system and method can function to augment the detectable client fingerprint from network traffic relating to such low level communication. This client fingerprint may circumvent many client tracking or identification techniques, and be used to preserve privacy and/or other applications.

A general implementation of the system and method can include editing data components of the network protocol data of a client and then facilitating network communication using the edited data components, which preferably results in an augmented client fingerprint as may be perceived by a third party server. Editing of the data components of the network protocol data can impact the communicated data from the client device, but may additionally involve modifying the operation and mode of performing communication between a client and a server. For example, the recitation of a different cipher suite in a TLS Client Hello message can result in using modified encryption compared to default encryption performed by the client.

The system method can be used in masking identifying characteristics of a client device. Programming language, libraries, and frameworks used in building a client device can result in patterns in communication patterns. In particular, patterns in the network protocol negotiation can be used as identifying signals. The system and method can address modifying such signals and then facilitating continued communication with a destination server. Other techniques such as changing higher level identifying details can additionally be used in combination with the system and method described herein.

The system and method may provide a number of potential benefits. The system and method are not limited to always providing such benefits, and are presented only as exemplary representations for how the system and method may be put to use. The list of benefits is not intended to be exhaustive and other benefits may additionally or alternatively exist.

As one potential benefit, the system and method may provide a level of privacy for the client device. By obfuscating the client fingerprint, the client may reduce undesired long-term tracking. The system and method may be used in connection with a user-controlled client device, such as a browsing application that a user may use to access particular network accessible resources. Alternatively, the client device may be a computer-controlled client device, which may include examples such as a web scraping service, server side service executed in cloud hosted infrastructure, an automated script, and/or application. As one example, the system and method may be used by an application programming interface (API) service operable on one or more computer-implemented devices that offers API access to other third party resources. Internal client resources of the API service may execute a script or other suitable type of application to access, interpret, interact, and/or otherwise interface with the third party resources. The system and method may be used to avoid detection or tracking by a third party.

As another potential benefit, the system and method may enable access to sites or resources that are typically blocked or limited. By selectively setting the client fingerprint, the client may be able to access certain websites or network-accessible resources that are normally accessible only to particular types of users or those matching a particular client fingerprint.

As another potential benefit, the system and method may be configured to secure a platform or service. A computing system may implement the system and method to create their own unique private client fingerprint, which can be used for authentication and/or authorization. The computing system may then only allow access to a client that implements that specific unique client fingerprint. Types of computing systems that may use the system and method as an authentication process could include various types of computing platforms (e.g., banks, shopping sites, media service platforms, etc.), enterprise solutions, networking infrastructure systems, API service providers, and/or other suitable types of computing systems.

The system and method may have particular applicability for any person and/or organization that desires greater privacy and/or desires greater control of their internet experience. In one implementation, the system and method may be implemented as an internal system solution for altering how one's own system establishes network connections. In another implementation, the system and method may be implemented as a third party service, wherein network traffic of a first party may be augmented through the system and method.

As a related aspect, the system and method may additionally include or be used in connection with instances of a system and method for filtering of internet traffic.

3.1. System for Maintaining Internet Anonymity

Figure 15:
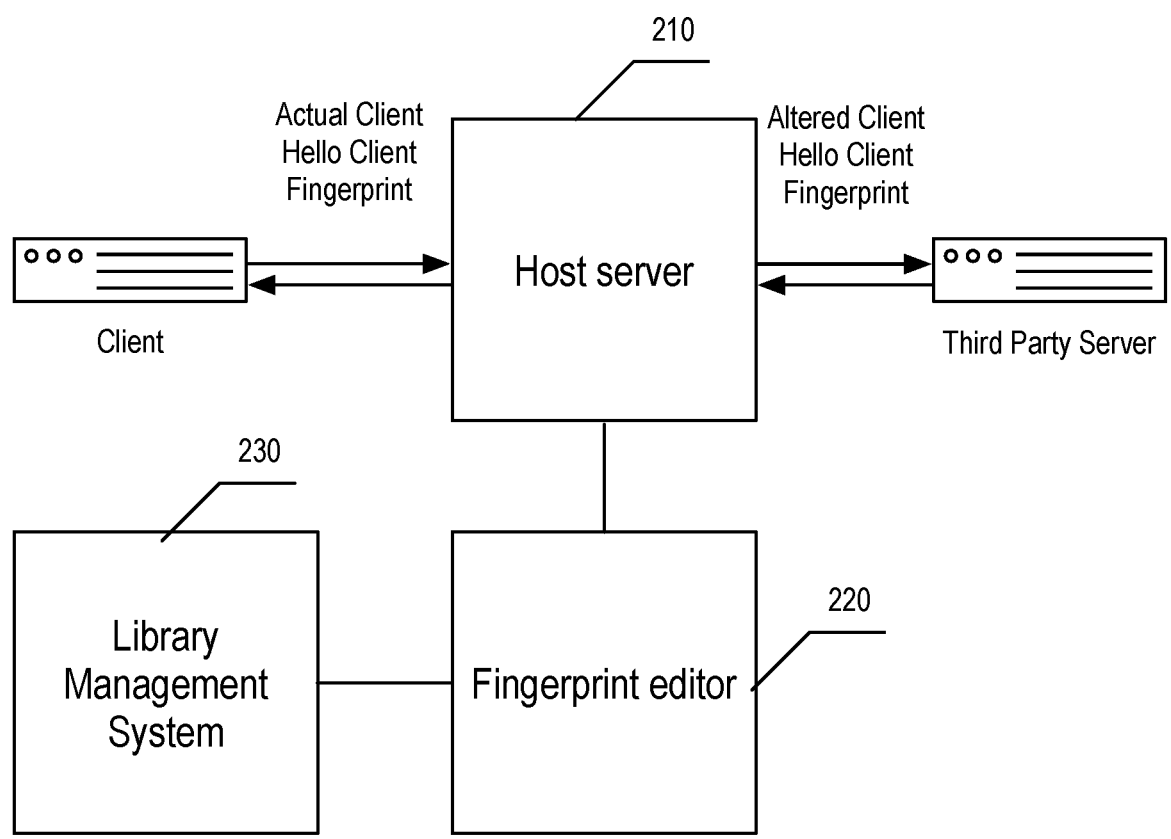
FIG. 15 is a schematic representation of a system of a preferred embodiment.

As shown in FIG. 15, a system of preferred embodiment to modify a client fingerprint, wherein the client fingerprint comprises of data components that can identify the details regarding the client to a server or other device accessing data communication from the client, includes: a host server 210 that receives client data; and a fingerprint editor 220 that edits the client fingerprint. The system may function to maintain privacy of the client during a server/client communication through obfuscation and spoofing of the client fingerprint. System components may access and modify application layer and other layer (e.g. transport layer) client data components as required to modify the client fingerprint. The system preferably alters the client fingerprint as may be accessed through data communication of a cryptographic protocol such as TSL/SSL network protocol data and/or other client-related signals. The client fingerprint may be primarily indicated during an initial TLS (or SSL) handshake. In some variations, the system may additionally facilitate continued network communication with the host server 210 acting as an intermediary translation service between the client and the server as shown in FIG. 2. As a significant portion of non-application layer data for the server/client communication is network protocol data that describes the communication capabilities of the client, in some variations the system includes a library management system that can access necessary data libraries to ensure server/client compatibility. The system may alternatively be implemented such that a client can use the system in determining configuration for how to modify its communication to alter its signature. For example, a client can request of a fingerprint editor 220 service the desired specification for how to adjust communication, receive a response from the fingerprint editor 220 service, and then the client can make the appropriate adjustments (possibly enabling library access as a result of specified modifications).

The client fingerprint may include a device fingerprint, a machine fingerprint, and/or a browser fingerprint. The client fingerprint may include other types of fingerprints that reveal identifiable information regarding the client. The client fingerprint may include data components from network protocol data, for a server/client communication, and a client message. In preferred variations, the system focus is on the client fingerprint data components from the network protocol data. Examples of network protocols data may include: Cisco Discovery Protocol (CDP), Internet Protocol version 4 (IPv4), Internet Protocol version 6 (IPv6), Internet Control Message Protocol (ICMP), IEEE 802.11, Transmission Control Protocol (TCP), Simple Network Management Protocol (SNMP), Network Basic Input/Output System (NetBios), Server Message Block (SMB), File Transfer Protocol (FTP), Hypertext Transfer Protocol (HTTP), Telnet, Transfer Layer Security/Secure Socket Layer (TLS/SSL), and Dynamic Host Configuration Protocol (DHCP).

In preferred variations, the client fingerprint includes TSL/SSL network protocol data. More preferably, the data components of any version of a client hello message from a TSL/SSL) handshake to initiate a server/client communication. The client hello message may contain the current version number of TLS/SSL, a list of cipher suites supported by the client in order of client preference, and a random byte string. The client hello message may include a list of suggested compression methods, a session ID, and an indicator for if the client can use Application-Layer Protocol Negotiation. The client hello message may additionally include a list of supported application protocols. The client message may further include additional information.

In one preferred variation, the client fingerprint includes the cipher suite list of the client hello message; wherein both the elements of the cipher suite list, and the order of elements comprise the client fingerprint. The cipher suite may function as a communication to the server as a list of encryption algorithms that the client can implement in order of client preference. Configuration of the fingerprint editor 220 to edit the cipher suite list can include configuration to modify the listed cipher suites and/or alter the order of the cipher suites.

In a second preferred variation where the cipher suite list includes elliptical curve cryptography (ECC), the client hello message may also contain a list of ECC cipher suites that the client can support and an accompanying list of point formats that the client can parse. The client fingerprint preferably includes the point formats, wherein both the elements of the list of point formats and the order of elements can comprise the client fingerprint. Configuration of the fingerprint editor 220 to edit the list of point formats can include configuration to modify the listed point formats and/or alter the order of the point formats.

In a third preferred variation, the client fingerprint includes a list of compression methods of the client hello message; wherein both the elements of the list of compression methods and the order of elements comprise the client fingerprint. The list of compression methods may be a list of hashing algorithms that the client is able to implement to reduce the size of information sent back and forth between the server and client. Configuration of the fingerprint editor 220 to edit the list of compression methods can include configuration to modify the compression methods in the list and/or alter the order of the compression methods.

In a fourth preferred variation, wherein the client hello message includes the Application-Layer Protocol Negotiation Extension (ALPN), the client hello message includes a list of client supported application protocols (e.g. HTTP/2). The client fingerprint preferably includes the list of client supported application protocols; wherein both the elements of the list of client supported application protocols and the order of elements, comprise the client fingerprint. Configuration of the fingerprint editor 220 to edit the list of client supported application protocols can include configuration to modify the listed supported application protocols and/or alter the order of the application protocols.

In a fifth preferred variation, the client fingerprint includes the list of client supported extensions from the client hello message; wherein both the elements of the list of client supported extensions and the order of elements, comprise the client fingerprint. Configuration of the fingerprint editor 220 to edit the list of point formats can include configuration to modify the listed supported extensions and/or alter the order of the supported extensions.

The system may function as a host service provider. The host system may receive a data packet from the client. The host system may then modify the client fingerprint as desired or specified and then send the data packet to a client-desired destination. Since client privacy is priority of the service, in preferred variations, the system service focuses to spoof and/or obfuscate client fingerprint data components from the network protocol data. In other variations, the client message data may additionally or alternatively be spoofed or obfuscated.

The host server 210 of a preferred embodiment functions to receive incoming client data. In one variation, the host server 210 acts as an intermediary services that receives incoming client data, monitors and selectively modifies communication data and then relays communication to intended destination. In the intermediary variation, the host server 210 may function as a typical server and receive client data as a data packet through a server/client communication (e.g., over a network connection). The host server 210 can manage a first communication leg with the client and a second communication leg with the destination server.

In another variation, the host server 210 can act as an accessible endpoint. In an endpoint variation, the host server 210 may receive client data and then supply configuration data specifying communication modifications to be made by the client. This may involve the client supplying their own intended data communications so that their own data communications may be modified directly at the host server 210. This may alternatively involve, the client requesting a type of signature and receiving configuration data to match a specific or type of signature. This variation may function to mitigate the amount of data exposed to the host server 210.

Figure 4:
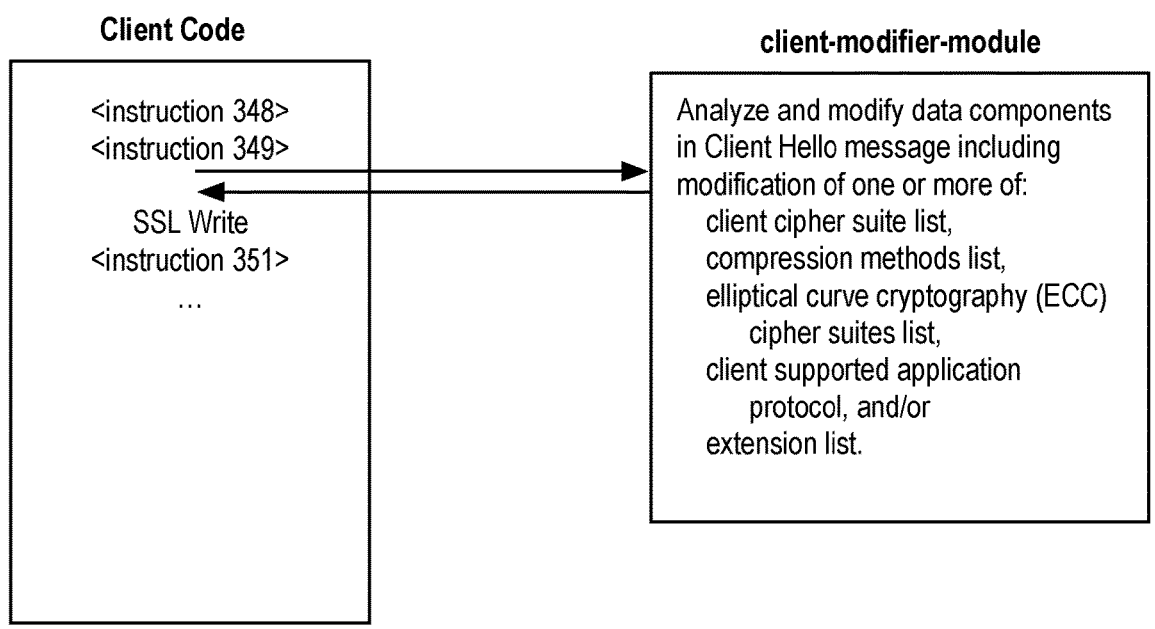
FIG. 4 is a schematic representation of configuration and use of LD_PRELOAD for enabling client fingerprint anonymity of a client using an interrupt.

In an internal system variation, the host server 210 may be an internal system (e.g. software package, VM) wherein the client may transfer, typically outgoing, data packets that may be modified prior to sending. An internal host server 210 can be implemented as instructions operable on a computing device that is directly accessible by a client. In this way, the operations of the host server 210 can be performed during internal preparation of communication and prior to sending outbound communications over an external network connection. In another exemplary implementation, the configured functionality of the host server 210 may be implemented as a statically compilable and/or linkable code library. The client communications can be modified as described here through use of such a shared or static library. In one example, the host server 210 could be a background server integrated into operation system execution. In another exemplary implementation, the host server 210 may be dynamically implemented as an LD_PRELOAD module or an equivalent computer system level interrupt routine. In this variation, the execution of a computing device is modified so that a custom instruction routine of the host server 210 can be executed in response to an execution condition of the client (e.g., encountering one of a specified list of instructions). For example, LD_PRELOAD module may be configured so that when a client goes to do an TLS/SSL read or write, a routine for analyzing and editing the data communication can be performed before outbound communication is sent as shown in FIG. 4.

The fingerprint editor 220 of a preferred embodiment functions as a system that manipulates one or more aspects of network communication from a client. The fingerprint editor 220 may enable editing of client fingerprint data components within the network protocol data. That is, the fingerprint editor 220 may enable modification of any network protocol data that is, or may be, used to identify a client user. The fingerprint editor 220 preferably has an obfuscation operation mode and a spoofing operation mode.

The fingerprint editor 220 preferably has a spoofing operation mode. The fingerprint editor 220 in the spoofing operation mode functions to change the client fingerprint to resemble the fingerprint of a second client. For example, the client fingerprint for a client using a first operating system may be altered to resemble the client fingerprint for a different type of device using a second operating system. The fingerprint editor 220 with a spoofing operation mode can include instructions that when executed cause a processor of the fingerprint editor 220 to read and analyze the data components of client components and then edit the data components. The data components are preferably analyzed for how they relate to one or more target fingerprints (e.g., fingerprints from other device types like smart phone, a particular application, a desktop browser, etc.). Editing of the data components preferably modifies the data components with an objective of transforming the client fingerprint to match or emulate a fingerprint of the one or more target clients (e.g., other types of client devices or applications). In a variation where there may be multiple possible target clients to which the fingerprint may match, the spoofing operation mode may include configuration to find minimally invasive edits (or at least reduce the complexity of edits). A target fingerprint that conforms closer to the fingerprint of the client may be selected as the target. This may function to avoid enabling new capabilities for the client. For example, if the one possible target client shares a cipher suite with the client, then that one may be selected over another target client where a new cipher capability will need to be enabled.

The fingerprint editor 220 preferably also has an obfuscation operation mode. The fingerprint editor 220, in the obfuscation operation mode, functions to make the client not recognizable as the same client over multiple server/client communications. That is, in obfuscation mode, the fingerprint editor 220 may periodically change the client fingerprint over multiple server/client communications. The obfuscation mode may be implemented in a dedicated manner for a single client, but may additionally be coordinated across a number of clients, which may all be accessing the same/similar server destination.

The periodic changes in the client fingerprint may be small, such that the client appears to be a different client connecting from the same type of device (e.g. a communication from a different person from the same type of Android Samsung phone each time), or the periodic changes may be as large as desired (e.g. one client communication is from a first type of device, the next client communication is from a second type of device). The fingerprint editor 220 may function simultaneously in obfuscation mode and spoofing mode. For example, a client utilizing a first type of device may connect multiple times to a server, each time as a different device selected from a set of client fingerprints.

The fingerprint editor 220 may additionally have a manual operation mode. In the manual operation mode, a user may manually modify fingerprint data components as desired.

The fingerprint editor 220 may additionally or alternatively include a synthesis mode. In the synthesis mode, the fingerprint editor 220 creates an artificial client fingerprint. The artificial client fingerprint is preferably different from the actual client fingerprint and set to preferably be differentiated from any other actual client fingerprints. In some variations, a generated artificial client fingerprint may include component properties that are set explicitly to differentiate the client fingerprint. For example, a generated string can be listed as an encryption algorithm in the cipher list of a client hello message. Synthesized client fingerprints may be coordinated with a destination server. And can be used for easier whitelisting or blacklisting of client access and/or for authentication.

The system may further include a library management system 230. The library management system 230 may function to maintain and update fingerprint associations. From the previously mentioned cipher suite example, the library management system 230 may maintain and update the associated cipher suite list for a number of target client devices. The client fingerprint patterns for one or more target client devices are preferably stored within the library management and can be accessed to determine how a client fingerprint should be edited. The library management system 230 may monitor or otherwise maintain data on client fingerprints and their association with various target devices. This can be done through monitoring outside traffic or by profiling client devices actively controlled for the purposes of characterizing their client fingerprint.

Additionally the library management system 230 may maintain and update fingerprint associated data components (e.g., services/functionality that are necessary for the functionality of the fingerprint). Returning to the cipher suite example, the library management system 230 may maintain and update all the cipher suite algorithms maintained on all updated fingerprints. The library management system 230 may locally maintain fingerprint associated data components (e.g. on a server) or access them when necessary (e.g. link/URL). The library management system 230 may then enable a client to utilize fingerprint associated data component that it would normally not have access to. For example, the library management system 230 may enable the client to use a cipher suite that it does not have.

3.2 Method for Maintaining Internet Anonymity

Figure 16:
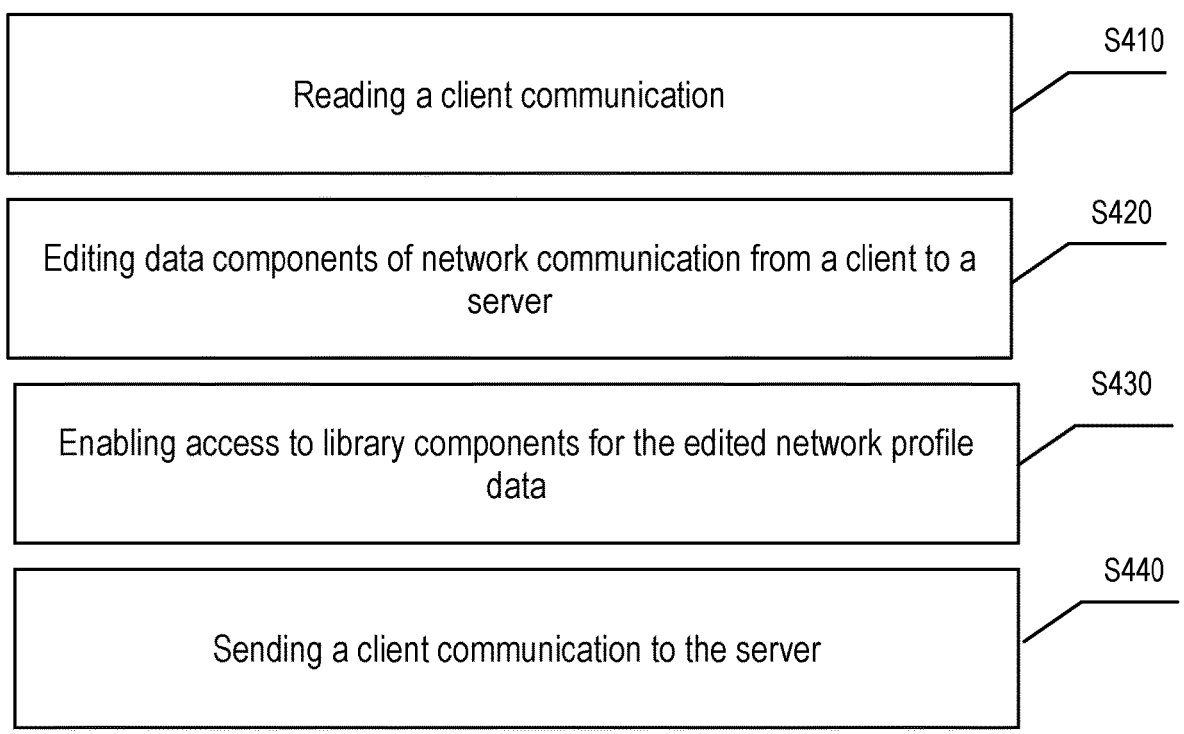
FIG. 16 is a flowchart representation of a method of a preferred embodiment.

As shown in FIG. 16, a method of a preferred embodiment to modify a client fingerprint, wherein the client fingerprint comprises of data components that can identify the details regarding the client to a server includes editing data components of network communication from a client to a server S420, which may include editing network protocol data of the client; selectively enabling access to library components specified in the edited client network protocol data S430; and sending a client communication to the server using the edited client network protocol data S440. The editing of network protocol data of the client is preferably performed for and during network protocol data for a cryptographic protocol. The method may function to maintain the anonymity of the client device by modifying identifying features of the client in the client network protocol data (i.e. modifying the client fingerprint). Variations of the method may provide a wide degree of control over the client fingerprint such that manipulation of the client fingerprint may be put to use in a variety of ways such as: simulating a particular device, appearing as a normal representative population, as an additional or alternative form of authentication/authorization, and/or used in any suitable manner.

The method can be used where the cryptographic protocol is a TLS/SSL protocol. More specifically, the method can be used for modifying potentially identifying signals exposed in a client data packet exchanged during the handshake negotiation of a cryptographic protocol. The client data packet more specifically is a client hello data packet communicated by the client device prior to establishing encrypted communication between the client and the server. The client hello data packet preferably serves as a client-provided description of client security configurations. The client security configurations can describe the types and/or versions of cryptographic protocols supported, the list of cipher suites, compression methods, supported application protocols, extensions, and/or other features. These various data packet components in the original unedited client data packet may be ordered by client preference and/or priority. In one preferred variation, the cryptographic protocol is a TLS/SSL protocol and the ClientHell® data packet is the TLS/SSL client hello message communicated when establishing or re-establishing a TLS/SSL session. Since the client data packet is exchanged during the handshake portion of the negotiation to establish a secure session, the data packets are exchanged in an unencrypted format (e.g., in plain text).

Figure 17:
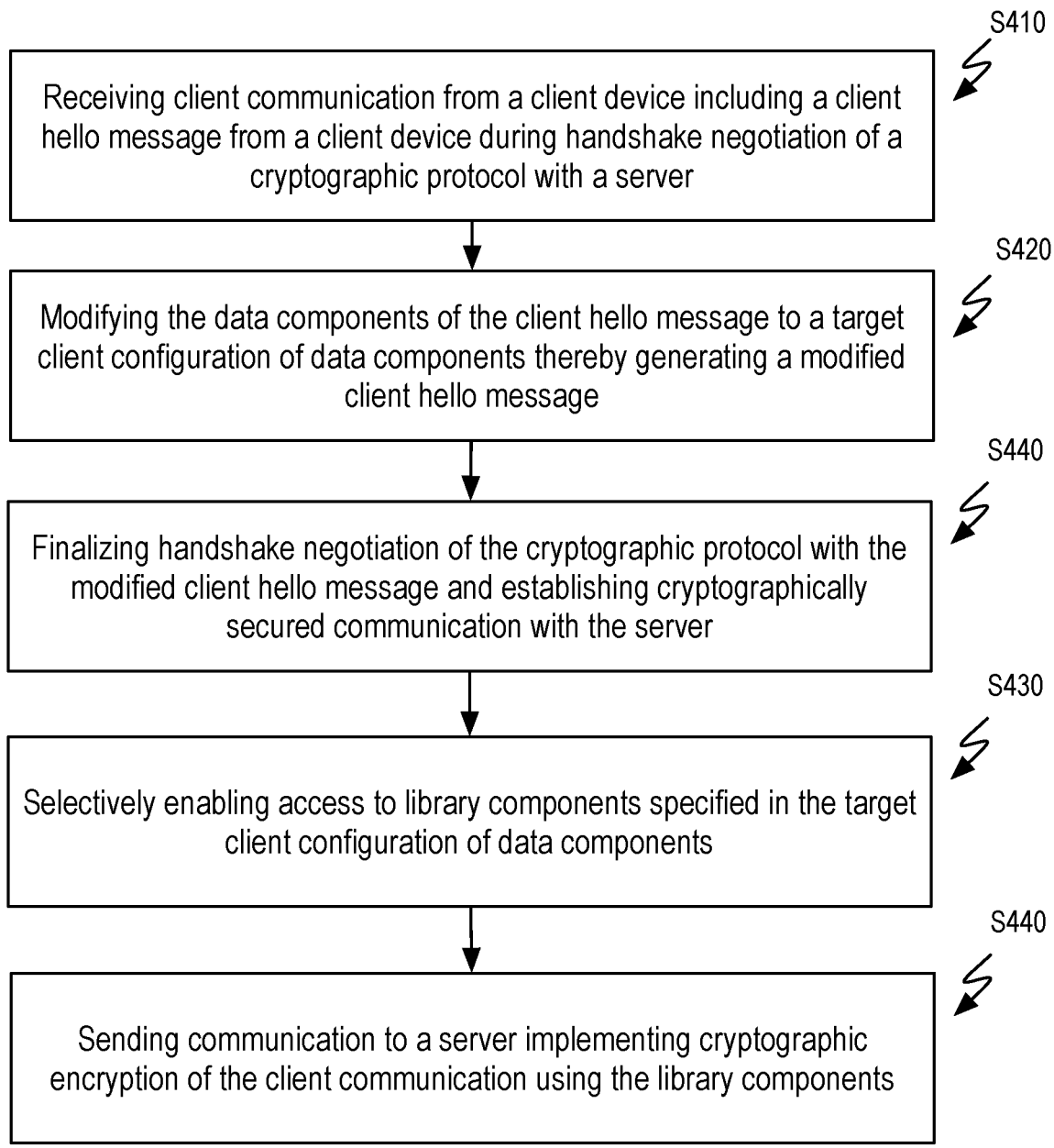
FIG. 17 is a flowchart representation of a method of applied to anonymizing TLS/SSL communication.

In the variation where the method is implemented for use with a TLS/SSL protocol, client data packet is preferably a client hello message received during negotiation during TLS/SSL handshake protocol. Accordingly, an exemplary implementation of the method as shown in FIG. 17, can include: receiving client communication from a client device including a client hello message from a client device during handshake negotiation of a cryptographic protocol with a server; modifying the data components of the client hello message to a target client configuration of data components thereby generating a modified client hello message; finalizing handshake negotiation of the cryptographic protocol with the modified client hello message and establishing cryptographically secured communication with the server; selectively enabling access to library components specified in the target client configuration of data components; and sending communication to a server implementing cryptographic encryption of the client communication using the library components. In this way modifying of the client hello results in modified cryptographic communication between the client and the server, which may involve the use of a library component to supplement the functionality of the client.

Editing the network protocol data from the client during negotiation of the cryptographic protocol may further include replacing a set of data components of the network protocol data (e.g., replacing data components of the client hello message for negotiation during TLS handshake). Editing can be based on analysis of the data components of the client and/or a select target client fingerprint.

As shown in FIG. 18, a more detailed implementation can include: editing data components of network communication from a client device to a server, which includes editing TLS cryptographic protocol client hello message data from the client during negotiation of a TLS/SSL handshake protocol S420, which can include editing the message data to specify in the message data a modified supported version of TLS/SSL protocol, modified list of client cipher suites, modified list of compression methods, modified list of client point formats, modified list of client supported application protocols, and/or modified list of client supported extensions; selectively enabling access to library components specified in the edited client network protocol data S430, which may include enabling access to one or more of a library for the modified supported version of TLS/SSL protocol, library for the modified list of client cipher suites, a library for the modified list of compression methods, a, library for the modified list of client point formats, a library for the modified list of client supported application protocols, and/or a library for the modified list of client supported extensions; and sending a client communication to the server using the edited client network protocol data S440. The server will then complete cryptographic protocol negotiation according to the modified client hello message. Ongoing communication with the server will conform to that negotiated cryptographic communication. The enabled access to the library components will preferably facilitate translation from the data communications of the client to a format expected at the server. Furthermore, if the server analyzes the fingerprint signals of the TLS traffic, they will preferably expect the client to be one matching the modified fingerprint.

In one variation, the method may be implemented with direct integration with the client device such that the method is implemented substantially at the client device. The method may alternatively and additionally include reading a client communication S410 wherein the method is implemented by an intermediary device/service. In a variation where the method is implemented within a multitenant service, multiple different account holders may direct network communication(s) through the service to enable client fingerprint modification.

As shown in FIG. 2, reading a client communication can include receiving a network communication from the client at a proxy server. The proxy server is preferably a distinct computing device from a computing device of the client.

As shown in FIG. 3 and FIG. 4, the method may alternatively make use of a service locally accessible by the client. A shared or static library on the device, a locally running service, or other mechanism can be used so that data communication is edited and library component access and usage enabled on the computing device of the client prior to sending outbound communication. A library could be compiled into the codebase of the client or could be a linkable code library locally usable by the client for modification of the client communications. In preferred variation, the method can implement an interrupt service for regulating communication data sent out by a computing device of the client. The interrupt service can be enabled through a LD_PRELOAD environment variable specified module or script. This can be set before launching a UNIX process for example. LD_PRELOAD can be used to wrap code to modify client process behavior to load a library (or other suitable type of script) with priority above system libraries. The LD-preload specified script can be configured to initiate editing of the data components and selectively enabling access to library components in response to specific instruction routines such as SSL read, SSL write, or SSL connect. LD_PRELOAD is one exemplary mechanism to inject executable logic into executable client code.

As a detailed description of the method applied in preloader implementation shown in FIG. 4, the method can include, for a client, configuring a LD_PRELOAD (a preloading script) environment variable with a fingerprint editing script (or "module"); in response to triggering of the fingerprint editing script during execution of the client, editing network protocol data from the client during negotiation of a cryptographic protocol (e.g., a TLS protocol) S420; selectively enabling access to library components specified in the edited client network protocol data S430; and sending a client communication to the server using the edited client network protocol data S440.

Block S410, which includes reading a client communication, functions intercept or receive network communication at the host service. The network communication that is read preferably relates to the client network protocol. The client communication may comprise of just the client network protocol data. Alternatively, the client communication may comprise of a data packet (or multiple data packets) containing one or more client communications. A client communication may be a communication to the host, wherein a specific request is made of the server. Additionally and/or alternatively, a client communication may be a communication to the server, for the client/server communication. The client communication may include any and/or all desired data packages that can be used for network communication (e.g. application data, browser data, plain text). Reading a client communication of one preferred variation includes receiving a client hello data message from network traffic with a client device.

When offered as a proxy service, reading the client communication S410 may limit reading to components of the client communication that are specified for modification. Accordingly, reading the client communication can include maintaining client encryption of private data components from the client. This can function to preserve privacy of the client by avoiding inspection of all client communication. For example, during TLS protocol negotiation, the client hello data message will generally not include sensitive private data. The hello data message can be received and modified accordingly without the proxy service accessing any sensitive data. In one variation, enabling of access to library components can be enabled at the client device such that any subsequent client communication communicated to or from the server can be encrypted.

Reading the client communication S410 may additionally include decrypting and/or uncompressing the client network protocol data. Decrypting and/or uncompressing the client network protocol data may function to expose components of the client communication for modification.

In alternative implementations, client communications may be retrieved or accessed more directly at the client as discussed above. In a first variation, an interrupt routine can be implemented using a preloading mechanism. For example, a fingerprint editor library can be configured through a LD_PRELOAD environment variable for the client code. The fingerprint editor library preferably facilitates execution of block S420 and S430 on appropriate client communications before sending the client communication. In another variation, the method includes providing a fingerprint editor library, which a client can integrate into its execution for facilitating modification of client communications.

Block S420, which includes editing data components, functions to change parts or all of the client network protocol data to hide and/or change identifiable traits of the client. As technologies change and advance, both the identifiable traits of the client and the data component of the client network profile that identifies the client trait may change. Examples of identifiable traits of the client may include: client platform (e.g. mobile phone, PC, server), IP address, operating system (e.g. Windows, OSX), operating system version, browser (e.g. chrome, safari), implemented programming libraries (e.g. GoLang, Python), implemented encryption algorithms (e.g. Triple DES, RSA), and/or other traits.

In one local implementation variation, editing data components of network communication from the client device is performed through a library accessible on a computing device of the client. In another local implementation variation, the method includes initially configuring a LD_PRELOAD module for the client; and wherein editing data components of network communication from the client device is performed in response to execution of the LD_PRELOAD module.

In remote proxy implementation variation, editing data components is performed at a computing device distinct from the computing device of the client. In this version the method includes establishing a first communication leg between the client and a proxy server and a second communication leg between the proxy server and the server.

Editing data components S420 may include editing data from any operation layer. Examples of network protocols that may be edited include: SMB, FTP, HTTP/S, Telnet, TLS/SSL, DHCP, SNMP, NetBios, TCP, IPv4, IPv6, ICMP, IEEE 802.11, and CDP. Particularly as a service, editing data components S420 preferably includes editing data components beyond the client network protocol data if they may be implemented as part of the fingerprint.

In one preferred variations, editing data components S420 includes editing network protocol data from the client during negotiation of a cryptographic protocol. The cryptographic protocol in one preferred variation is TLS/SSL network protocol. Accordingly, editing data components of network communication from a client device to a server can include editing TLS/SSL network protocol data. More preferably, editing data components S420 includes editing the client hello message of a TSL (or SSL) handshake for the initiation of a communication during negation of the cryptographic protocol. Editing data components S420 may include editing part of or the entire TSL handshake. In particular editing data components comprises replacing a set of data components of a client hello message of a network protocol data (e.g., in TLS/SSL). For example, replacing a data component can include replacing a cipher suit specified in the client hello message to a second cipher suite. It may additionally include adding, removing, and/or reordering or otherwise altering the listing of a data component. Changing of a data component may result in subsequent altering of communication with the server. In the example above adding the second cipher suite, enabling access to library components may additionally include enabling access to the second cipher suite and when sending the client communication to the server, cryptographically securing client communication using the library of the second cipher suite.

In one preferred example, editing the client hello message of a TSL (or SSL) handshake includes editing the client cipher suite list. The client cipher suite list is a list of the cipher suites encryption algorithms that the client can implement, listed in order of client preference. Editing the client cipher suite list may add and/or remove items from the client cipher suite list, delete the complete cipher suite list, change the ordering of elements on the cipher suite list, replace the cipher suite list with a different cipher suite list, and/or making any suitable change to the specification of the client cipher suite list in the hello client message.

Editing data components S420 may additionally include editing complementary data components, which functions to coordinate the components of the network communication. As in the editing the cipher suite list example, new elements added to cipher suite list may require additional data components outside of the cipher suite list. For example, if elliptical curve-cryptography (ECC) is added to the cipher suite list, editing data components S420 may further include adding to the client hello message a list of ECC cipher suites that the client can support and an accompanying list of point formats that the client can parse. Similarly, if the ECC is removed from the cipher suite list, editing data components S420 may include removing the list of ECC cipher suites and/or the list point formats.

In another preferred variation, editing the client hello message of a TSL (or SSL) handshake may include editing a list of compression methods within the client hello message. The list of compression methods may be a list of hashing algorithms that the client is able to implement. Hashing algorithms may reduce the size of information sent back and forth between the server and the client. Editing the list of compression methods within the client hello message may include adding and/or removing items from the list of compression methods, delete the one or all compression methods from the list, change the ordering of compression methods on the list of compression methods, replace the list of compression methods with a different list of compression methods, and/or making any suitable change to the list of compression methods in the hello client message.

In another preferred variation, editing the client hello message of a TSL (or SSL) handshake includes adding or removing an Application-Layer Protocol Negotiation Extension (ALPN) from the hello message. The ALPN may function to allow the application layer to negotiate which protocol to perform over a secure connection in an efficient manner. Additionally with the ALPN, editing the client hello message preferably includes editing a list of client supported application protocols (e.g. HTTP/2). Editing the list of client supported application protocols may comprise of: adding a list of client supported application protocols, removing a list of client supported application protocols, adding or removing any client supported application protocol from the list of client supported application protocols, changing the order of client supported application protocols on the list and/or performing any combination of the above.

In another preferred variation, editing the client hello message of a TSL (or SSL) handshake includes editing a list of client-supported extensions (e.g. server name indication). Editing the list of client supported extensions may include adding and/or removing a client supported extensions, removing a list of client supported extensions, adding or removing any client supported extensions from the list of client supported extensions, changing the order of elements on the list of client supported extensions, and/or any combination of the above.

Editing data components S420 may be enabled as a manual function directed by human configuration, as an automated task, and/or as a combination of manual and automated editing. Manually editing data components of network protocol data of the client S420 may comprise of an administrator (e.g. the client user or the host service provider) changing data components using a type of computing interface. The computing interface may be a programmatic interface such as an application programming interface or any suitable interface to manually configure the editing of network communication. The computing interface may alternatively be a graphical user interface wherein a user uses a visual interface to specify editing of the network communication.

Editing data components S420 may be completely or partially automated. Automated editing may function to dynamically set the components of the network communication to simulate a client fingerprint with particular properties. In one variation, editing data components may change the data components to correspond to a target client fingerprint. For example, automated editing may be implemented to spoof the client fingerprint to match a second client fingerprint. For example, the fingerprint of a desktop computer using a first type of operating system with C++ libraries may be modified to match the fingerprint of a mobile device using a second type of operating system.

The method may include specifying a target client (or a target client fingerprint), which functions to modify the client fingerprint to mirror that of another client. In this variation, editing data components S420 will preferably include modifying the data components to a target client configuration of data components.

The target client fingerprint in this variation is preferably one of an actual client. The target client fingerprint may be specified as an individual client fingerprint. A target client fingerprint may alternatively be specified as a set of possible client fingerprints. A set of possible client fingerprints may be generally specified by setting the target client fingerprint to a target client classification, where a client classification includes a variety of clients with a shared classification. For example, a target client may be specified as a browser-based client, which may include the set of target clients including mobile and desktop web browser clients. A target client fingerprint may be pre-configured when the client is making a request or initializing the fingerprint modifying service. The target client fingerprint may alternatively be specified and configured in any suitable manner including fixed in configuration of the fingerprint editor. Target client fingerprints may be maintained and understood based on classification approaches such as those described above.

In one variation where a target client fingerprint includes a variety of client fingerprints, the method may include comparing the client fingerprint attributes of the client to the set of client fingerprint attributes and selecting a minimally invasive target client fingerprint. This may be used to find a way of modifying the client fingerprint but to minimize the impact of conforming communication to the modified client fingerprint. For example, a target client fingerprint may be selected that shares functional capabilities with the client such sharing the same cipher list and/or list of compression methods (possibly listed in a different order).

Automated editing may additionally or alternatively include varying editing of data components across multiple instances of client communication with a destination, which functions to obfuscate a single client device or group of client devices. That is, automated editing may be utilized to periodically alter the client network protocol data such that every series of communications by the client can have a new fingerprint, making the client network communication to appear to periodically originate from different client devices. In one preferred variation, the client fingerprint may be altered just sufficiently such that the client fingerprint is distinct but similar to the previous client fingerprint. For example, a client fingerprint of a mobile device of a first operating system may be altered to look like a different client for the same type of mobile device. In another preferred variation, the client fingerprint is altered significantly between each iteration such that each generated client fingerprint is completely different from the previous client fingerprint. Any and all types and combinations of degrees of variations may be implemented as desired in changing the client fingerprint.

As an exemplary description of the process of an automated editing mode that rotates client fingerprint, editing data components S420 can include during a first instance: modifying the data components to a first target client configuration of data components and performing corresponding selective enabling of access to library components of the first target client configuration and sending the client communication; and then during a second instance: modifying the data components to a second target client configuration of data components and performing corresponding selective enabling of access to library components of the second target client configuration and sending the client communication. In this way a client may first appear to have a client fingerprint of a first target client and then change to appear to have a client fingerprint of a second target client.

In one variation, varying the editing of data components is performed for network communication of a single client device. The targeting of a different client fingerprint is preferably triggered at key events. For example, for each "session" or series of interactions with a third party service, the client fingerprint may be refreshed. In another variation, varying the editing of data components may be performed across multiple client devices. Multiple devices may all interface with a third party service, and the targeted client fingerprint can be varied across the set of client devices (and optionally for different sessions of each client device), which could function to mask coordinated access of a third party.

In an alternative variation, automated editing of the data components may be performed as part of creating a synthetic client fingerprint. A synthetic client fingerprint is characterized as a client fingerprint that is deliberately set to reflect an artificial fingerprint. In one variation, client devices may be set to a target synthetic client fingerprint such that a third party service could use the synthetic client fingerprint to uniquely distinguish the client. For example, a third party computing system may provide to a strategic partner configuration used to create a unique client fingerprint. Client devices of the strategic partner can connect to the third party service using the unique client fingerprint as a signal that the network traffic is by that strategic partner. In another variation, the synthetic client fingerprint could be uniquely generated for each client device and/or altered with any suitable amount of frequency. This may be applied as a form of authentication or authorization.

When used as an authentication factor, the method may include at the server, verifying that the client fingerprint corresponds to an associated synthetic client fingerprint expected for the client. For example, a synthetic client fingerprint may be implemented by an application so that a server can verify that the application is a legitimate instance of the application. In another example, an expected synthetic client fingerprint may be associated with a user account, a specific request (e.g., authentication request), or other element. The server can compare the expected synthetic client fingerprint to the client fingerprint for the client communication from the client. If the expected client fingerprint and the actual client fingerprint match then this factor of authentication is valid and can be confirmed. If the expected client fingerprint and the actual client fingerprint do not match then this factor of authentication is invalid.

In some instances, an edited client network profile data may indicate different client capabilities than the client actually supports. Accordingly, the method may include enabling access to library components specified for the edited client network protocol data, which functions to access necessary components that the client does not have, but may be required to. For example, in the variation where the cipher suite list of the client hello message has been altered, a cipher algorithm may be added to the cipher suite list that the client does not have. Enabling access to library components for the edited client network protocol data S430, in this example, preferably includes enabling the client to utilize the cipher algorithm that has been added to the cipher suite list. Enabling access to library components required for the edited client network protocol data S430 may give access to cipher algorithms, extensions, protocols, browsers, programming libraries, and/or any other necessary component with the edited client network protocol data.

As part of a service, selectively enabling access to library components specified in the edited client network protocol data S430, may function in conjunction with a managed library that maintains and updates libraries of network fingerprints and library components. Enabling access to library components required for the edited client network protocol data S430 may install or give the components to the client, create a virtual machine (VM) for the client with the necessary components, or act as a "man-in-the-middle", i.e. intercept client communication, utilize the appropriate components, and then transfer the resulting communication to its destination.

In a variation, where editing the data components includes adding a cipher suite, enabling access to library components can include enabling access to the cipher suite and cryptographically securing client communication using the cipher suite.

In a variation, where editing the data components includes adding a ECC cipher suite, enabling access to library components can include enabling access to the ECC cipher suite and cryptographically securing client communication using the ECC cipher suite.

In a variation, where editing the data components includes adding a compression method to the list of compression methods, enabling access to library components can include enabling access to the compression method and using the compression method during implementation of the cryptographic protocol for communication with the server.

Similarly in variations, where editing the data components includes adding ALPN, a client supported application protocol, and/or a client supported extension enabling access to library components can include enabling access to library or module for the added ALPN, client supported application protocol, and/or a client supported extension and using the added library or module during implementation of the cryptographic protocol for communication with the server.

Block S440, which may include sending communication to a server using the edited network protocol data functions in implementing the edited client network profile data with the new client fingerprint, in a communication with the originally intended destination. In the example where the TSL handshake client hello message is the edited client network profile data, the client and the server complete the TLS handshake and create a communication channel, but with the client using the disguised fingerprint.

In one preferred variation, sending communication to a server can include implementing cryptographic encryption of the client communication according to the network protocol data using the library components. In this variation, editing data components in block S220 includes replacing and/or adding at least one element to a data component of a client hello message of the network protocol data. In this variation, sending communication more specifically includes implementing cryptographic encryption of the client communication according to the set of data packet components using the library components. For example, if a new cipher suite is added to the list of cipher suites in the client hello message then a library for use of that cipher suite is enabled (either at the client or at proxy service) and then used for subsequent cryptographic communication. The communication may make use of any suitable added library component to comply with the modified client hello message.

When applied to modifying the client fingerprint exposed during TLS/SSL handshake negotiation, the method includes receiving client communication from a client hello message from a client device during handshake negotiation of the TLS/SSL cryptographic protocol with a server. The data components of the client hello message are modified (possibly to a target client configuration or a synthetic client configuration). Then as part of sending communication, block S440 may include finalizing handshake negotiation of the SSL/TLS cryptographic protocol with the modified client hello message and establishing a cryptographically secured communication with the server. During subsequent communications with the server, block S420 may further include sending communication to a server implementing cryptographic encryption of the client communication using the library components.

As a service, the host may further function as a man in the middle service. The host service may receive a request communication to a specific server (which may also be the client) from the client. In response to the client, the host service may then send the communication with the appropriate edited client network protocol data and the client communication. Correspondence between the client using modified fingerprint and the server may thus continue via the host service. Alternative communication architectures may also be used.

4. System Architecture

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

In one variation, a system comprising of one or more computer-readable mediums storing instructions that, when executed by the one or more computer processors, cause a computing platform to perform operations comprising those of the system or method described herein such as: reading client communication, editing data components of network communication from a client to a server, enabling access to library components for the edited network profile data, and sending a client communication to the server. Configuration to perform operations for any of the variations described herein may also be implemented.

Figure 19:
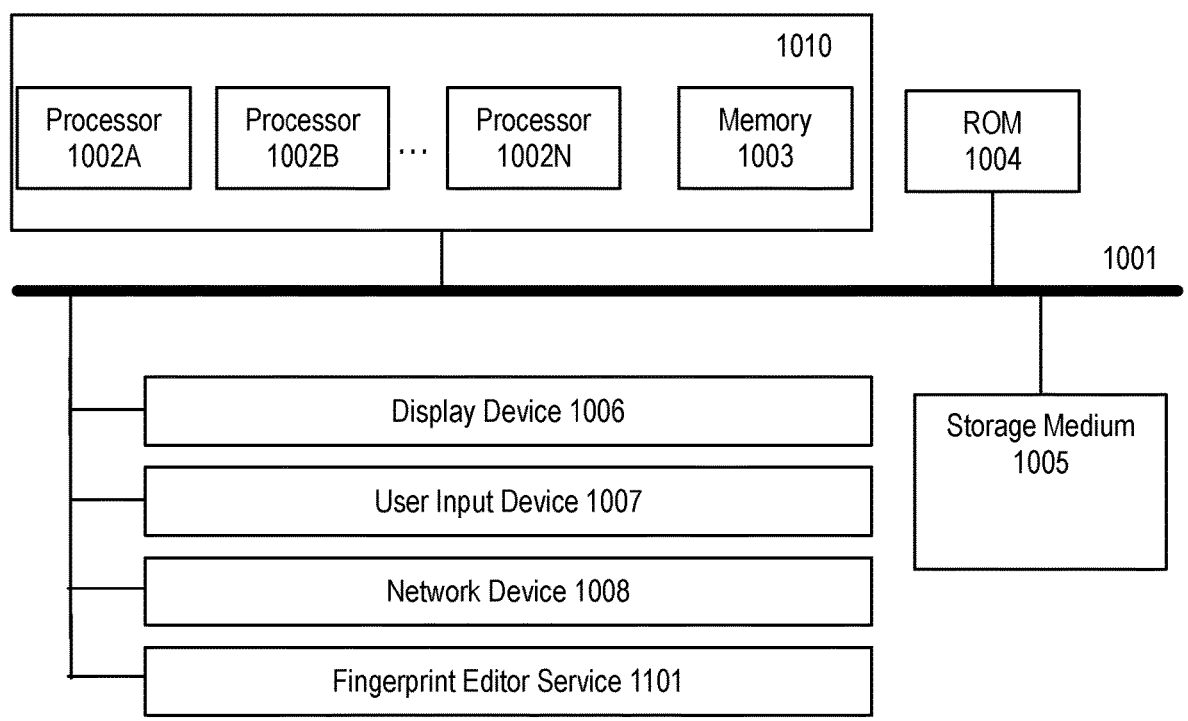
FIG. 19 is an exemplary system architecture that may be used in implementing the system and/or method.

FIG. 19 is an exemplary computer architecture diagram of one implementation of the system. In some implementations, the system is implemented in a plurality of devices in communication over a communication channel and/or network. In some implementations, the elements of the system are implemented in separate computing devices. In some implementations, two or more of the system elements are implemented in same devices. The system and portions of the system may be integrated into a computing device or system that can serve as or within the system.

The communication channel 1001 interfaces with the processors 1002A-1002N, the memory (e.g., a random access memory (RAM)) 1003, a read only memory (ROM) 1004, a processor-readable storage medium 1005, a display device 1006, a user input device 1007, and a network device 1008. As shown, the computer infrastructure may be used in connecting a fingerprint editor service 1101, and/or other suitable computing devices.

The processors 1002A-1002N may take many forms, such CPUs (Central Processing Units), GPUs (Graphical Processing Units), microprocessors, ML/DL (Machine Learning/Deep Learning) processing units such as a Tensor Processing Unit, FPGA (Field Programmable Gate Arrays, custom processors, and/or any suitable type of processor.

The processors 1002A-1002N and the main memory 1003 (or some sub-combination) can form a processing unit 1010. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of the elements of the system.

A network device 1008 may provide one or more wired or wireless interfaces for exchanging data and commands between the system and/or other devices, such as devices of external systems. Such wired and wireless interfaces include, for example, a universal serial bus (USB) interface, Bluetooth interface, Wi-Fi interface, Ethernet interface, near field communication (NFC) interface, and the like.

Computer and/or Machine-readable executable instructions comprising of configuration for software programs (such as an operating system, application programs, and device drivers) can be stored in the memory 1003 from the processor-readable storage medium 1005, the ROM 1004 or any other data storage system.

When executed by one or more computer processors, the respective machine-executable instructions may be accessed by at least one of processors 1002A-1002N (of a processing unit 1010) via the communication channel 1001, and then executed by at least one of processors 1001A-1001N. Data, databases, data records or other stored forms data created or used by the software programs can also be stored in the memory 1003, and such data is accessed by at least one of processors 1002A-1002N during execution of the machine-executable instructions of the software programs.

The processor-readable storage medium 1005 is one of (or a combination of two or more of) a hard drive, a flash drive, a DVD, a CD, an optical disk, a floppy disk, a flash storage, a solid state drive, a ROM, an EEPROM, an electronic circuit, a semiconductor memory device, and the like. The processor-readable storage medium 1005 can include an operating system, software programs, device drivers, and/or other suitable sub-systems or software.

As used herein, first, second, third, etc. are used to characterize and distinguish various elements, components, regions, layers and/or sections. These elements, components, regions, layers and/or sections should not be limited by these terms. Use of numerical terms may be used to distinguish one element, component, region, layer and/or section from another element, component, region, layer and/or section. Use of such numerical terms does not imply a sequence or order unless clearly indicated by the context. Such numerical references may be used interchangeable without departing from the teaching of the embodiments and variations herein.

As a person skilled in the art will recognize from the previous detailed description and from the figures and claims, modifications and changes can be made to the embodiments of the invention without departing from the scope of this invention as defined in the following claims.

I claim:

1. A method, comprising:
modifying a set of data components of a message received from a first device,
wherein the set of data components is modified from a first format associated with the first device to a second format associated with a second device,
wherein the message is a hello message,
wherein the modified set of data components establishes a fingerprint for the second device, and
wherein the fingerprint is associated with information that indicates a type of the second device;
selectively enabling access to library components specified in the modified set of data components of the message;
performing, based on the modified set of data components, negotiation of a cryptographic protocol; and
modifying, based on performing negotiation of the cryptographic protocol and based on the library components, ongoing communication from the first device.

2. The method of claim 1, wherein modifying the ongoing communication comprises encrypting the ongoing communication based on the library components.

3. The method of claim 1, wherein selectively enabling access to library components comprises enabling access to at least one of:
a first library associated with a compression method,
a second library associated with client point formats,
a third library associated with an application protocol related to the first device, or
a fourth library associated with an extension related to the first device.

4. The method of claim 1, wherein the modification of the set of data components occurs during performing the negotiation of the cryptographic protocol.

5. The method of claim 1, wherein modifying the set of data components comprises replacing a first cipher suite specified in the message with a second cipher suite associated with the second device.

6. A device, comprising:
one or more memories; and
one or more processors, coupled to the one or more memories, configured to:
modify a set of data components of a message received from a first device,
wherein the set of data components is modified from a first format associated with the first device to a second format associated with a second device,
wherein the message is a hello message,
wherein the modified set of data components establishes a fingerprint for the second device, and
wherein the fingerprint is associated with information that indicates a type of the second device;
selectively enable access to library components specified in the modified set of data components of the message;
perform, based on the modified set of data components, negotiation of a cryptographic protocol; and
modify, based on performing negotiation of the cryptographic protocol and based on the library components, ongoing communication from the first device.

7. The device of claim 6, wherein the one or more processors, to modify the ongoing communication, are configured to encrypt the ongoing communication based on the library components.

8. The device of claim 6, wherein the one or more processors, to selectively enable access to library components, are configured to enable access to at least one of:
a first library associated with a compression method,
a second library associated with client point formats,
a third library associated with an application protocol related to the first device, or
a fourth library associated with an extension related to the first device.

9. The device of claim 6, wherein the modification of the set of data components occurs during performing the negotiation of the cryptographic protocol.

10. The device of claim 6, wherein the one or more processors, to modify the set of data components, are configured to replace a first cipher suite specified in the message with a second cipher suite associated with the second device.

11. A non-transitory computer-readable medium storing a set of instructions, the set of instructions comprising:
one or more instructions that, when executed by one or more processors of a device, cause the device to:
modify a set of data components of a message received from a first device,
wherein the set of data components is modified from a first format associated with the first device to a second format associated with a second device,
wherein the message is a hello message,
wherein the modified set of data components establishes a fingerprint for the second device, and
wherein the fingerprint is associated with information that indicates a type of the second device;
selectively enable access to library components specified in the modified set of data components of the message;
perform, based on the modified set of data components, negotiation of a cryptographic protocol; and
modify, based on performing negotiation of the cryptographic protocol and based on the library components, ongoing communication from the first device.

12. The non-transitory computer-readable medium of claim 11, wherein the one or more instructions, that cause the device to modify the ongoing communication, cause the device to encrypt the ongoing communication based on the library components.

13. The non-transitory computer-readable medium of claim 11, wherein the one or more instructions, that cause the device to selectively enable access to library components, cause the device to enable access to at least one of:
a first library associated with a compression method,
a second library associated with client point formats,
a third library associated with an application protocol related to the first device, or
a fourth library associated with an extension related to the first device.

14. The non-transitory computer-readable medium of claim 11, wherein the modification of the set of data components occurs during performing the negotiation of the cryptographic protocol.

15. The method of claim 1, wherein the first device is a client device, and
wherein the second device is a targeted device.

16. The method of claim 1, wherein the ongoing communication conforms to the negotiated cryptographic protocol using the library components to facilitate translation of data of the ongoing communications to a particular format.

17. The device of claim 6, wherein the first device is a client device, and
wherein the second device is a targeted device.

18. The device of claim 6, wherein the ongoing communication conforms to the negotiated cryptographic protocol using the library components to facilitate translation of data of the ongoing communications to a particular format.

19. The non-transitory computer-readable medium of claim 11, wherein the first device is a client device, and
wherein the second device is a targeted device.

20. The non-transitory computer-readable medium of claim 11, wherein ongoing communications conform to the negotiated cryptographic protocol using the library components to facilitate translation of data of the ongoing communications to a particular format.

\* \* \* \* \*